US012425716B2

(12) United States Patent
Al Majid et al.

(10) Patent No.: US 12,425,716 B2
(45) Date of Patent: Sep. 23, 2025

(54) CONTENT CAPTURE WITH AUDIO INPUT FEEDBACK

(71) Applicant: Snap Inc., Santa Monica, CA (US)

(72) Inventors: Newar Husam Al Majid, New York, NY (US); Laurent Desserrey, Los Angeles, CA (US); Christie Marie Heikkinen, Santa Monica, CA (US); Nathaniel Parrott, Brooklyn, NY (US); Jeremy Voss, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 530 days.

(21) Appl. No.: 16/909,850

(22) Filed: Jun. 23, 2020

(65) Prior Publication Data

US 2020/0412975 A1 Dec. 31, 2020

Related U.S. Application Data

(60) Provisional application No. 62/868,191, filed on Jun. 28, 2019.

(51) Int. Cl.
*H04N 23/63* (2023.01)
*G06F 3/0484* (2022.01)
*G06F 3/0487* (2013.01)
*G06F 3/04883* (2022.01)
*G06F 9/54* (2006.01)
*G06N 20/00* (2019.01)
*G10L 25/60* (2013.01)

(52) U.S. Cl.
CPC ......... *H04N 23/631* (2023.01); *G06F 3/0484* (2013.01); *G06F 3/0487* (2013.01); *G06F 3/04883* (2013.01); *G06F 9/542* (2013.01); *G06N 20/00* (2019.01); *G10L 25/60* (2013.01)

(58) Field of Classification Search
CPC .......... H04N 5/232933; G06F 3/04883; G06F 9/542; G06F 3/167; G06N 20/00; G06N 3/0454; G06N 3/08; G10L 25/60
See application file for complete search history.

(56) References Cited

U.S. PATENT DOCUMENTS

| | | | | |
|---|---|---|---|---|
| 2008/0204427 A1* | 8/2008 | Heesemans | ........... | G06F 3/0414 345/173 |
| 2011/0317848 A1* | 12/2011 | Ivanov | ..................... | H04R 1/08 381/94.2 |
| 2015/0179186 A1* | 6/2015 | Swierk | .................... | G10L 25/60 704/276 |

(Continued)

*Primary Examiner* — John T Repsher, III
(74) *Attorney, Agent, or Firm* — SCHWEGMAN LUNDBERG & WOESSNER, P.A.

(57) ABSTRACT

Systems, devices, methods, instructions stored on media, and other embodiments for a camera interface are described. One embodiment is a method of providing audio input feedback during content capture using a camera, which can involve initiating capture of a piece of content in response to a capture input touch action received at a camera interface on a touchscreen display of the computing device and then processing data from a microphone of the computing device to identify an audio stream associated with the piece of content. An audio quality score is determined from the audio stream, and a feedback signal is displayed on the touchscreen display of the computing device while the capture input touch action is ongoing and associated with capture of the piece of content.

20 Claims, 15 Drawing Sheets

(56) References Cited

U.S. PATENT DOCUMENTS

| | | | |
|---|---|---|---|
| 2016/0239165 A1* | 8/2016 | Chen | H04L 51/52 |
| 2017/0188167 A1* | 6/2017 | Li | H04R 29/004 |
| 2018/0241707 A1* | 8/2018 | Sarafa | H04L 63/0428 |
| 2018/0268870 A1* | 9/2018 | Chen | H04N 21/8549 |
| 2019/0018570 A1* | 1/2019 | Zeng | G06F 3/04845 |
| 2020/0105291 A1* | 4/2020 | Sheaffer | H04R 3/005 |
| 2020/0286504 A1* | 9/2020 | Seetharaman | G10L 21/0232 |
| 2022/0157058 A1* | 5/2022 | Raethke | G06V 10/454 |

* cited by examiner

CONTENT CAPTURE WITH AUDIO INPUT FEEDBACK

PRIORITY CLAIM AND INCORPORATION BY REFERENCE

This application claims priority to U.S. Provisional Patent Application Ser. No. 62/868,191, filed on Jun. 28, 2019, and entitled "Content Capture with Audio Input Feedback", which is incorporated by reference herein in its entirety.

TECHNICAL FIELD

Embodiments of the present disclosure relate generally to graphical user interfaces (GUI), and more particularly, to systems for generating and causing display of GUIs for a modular camera interface with audio input feedback operating on a device such as a smartphone.

BACKGROUND

Computing devices such as smartphones continue to increase in processing power, and to include higher power sensors. Such resources enable increasingly complex applications and interfaces for providing functionality to device users.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
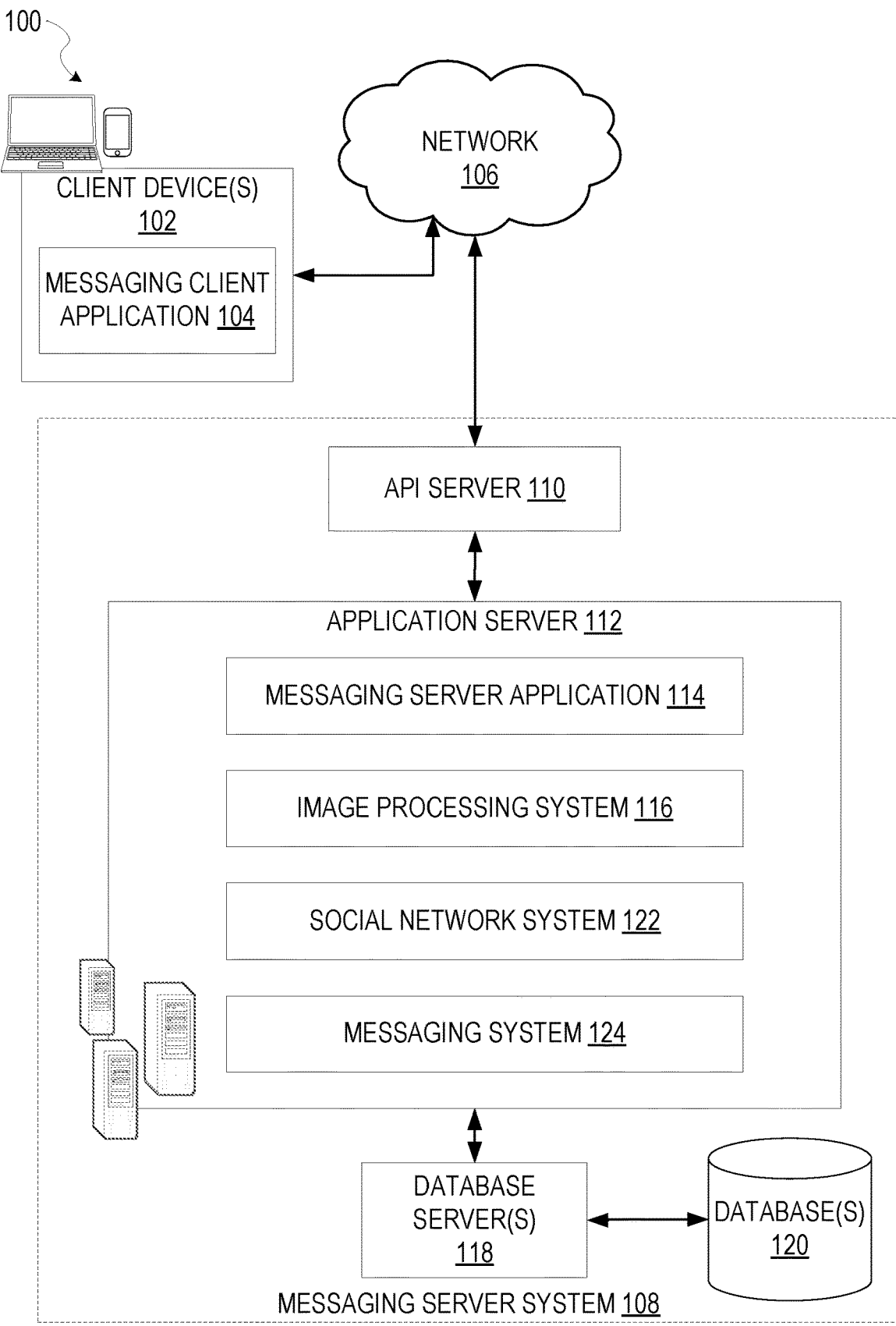
FIG. 1 is a block diagram showing an example messaging system for exchanging data (e.g., messages and associated content) over a network in accordance with some embodiments, wherein the messaging system includes a messaging client application that uses a modular camera interface.

Systems, methods, user interfaces, instructions stored in media, computing devices, and other various embodiments associated with creation and presentation of modular camera interfaces in a computing device are described.

A modular camera interface as described herein provides a standardized camera interface with context elements customized based on the interface used to initiate display of the camera. This enables a complex application which incorporates different functionality (e.g. chat, image and video messaging with various lens and overlay functionality, content collection, etc.) to provide a significantly standardized content capture experience with streamlined, context-sensitive elements that reduce the number of user actions to capture and communicate content based on the different functionality (e.g., sending images in a chat interface, adding images to a content collection, testing lens functionality, etc.).

Additionally, in some embodiments the modular camera interface may provide an active audio input feedback system. While camera systems often provide a display screen or other visual system that may be used to assess the quality and content of an image being captured by image sensors, such feedback for audio is typically much more limited, and based on what a user is hearing rather than data being run through the capturing device. Such feedback, however, does not provide adequate notice of wind hitting a microphone or other such audio events that may drastically reduce audio quality. Some embodiments described herein process an audio data stream at a device while associated image data is being recorded, and provides immediate feedback on the recorded audio quality while the recording is occurring. Such feedback can take the form of color outputs or shape outputs around a camera element used to control content recording. Such feedback provides immediate audio input quality feedback without significantly interfering with the visual feedback provided on a screen in a touchscreen environment where the screen is used to both control recording and display the recorded image during recording.

Such embodiments improve the performance of a computing device with an image sensor by reducing the number of interface actions to control image capture functionality in such a device, and also improve the efficiency of screen information presentation in a space-limited environment when content is being captured. These benefits are also associated with reduced use of processing and power resources in such computing devices with sensors (e.g., image and/or audio sensors).

Such benefits are particularly present in a computing device application for an ephemeral social messaging system, where efficient capture and sharing of content (e.g., images and video clips) with annotations such as test or image lenses have significant preferences for speed and ease of use in different messaging contexts, such as chat, content collection (e.g., collections of images and/or videos to create stories), and other such application features, while also emphasizing privacy and data security with associated ephemeral deletion trigger options.

FIG. 1 is a block diagram showing an example messaging architecture 100 for exchanging data (e.g., messages and associated content) over a network. The messaging architecture 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). Messages in such a system may include content, such as a video clip with audio data, and such messages may be communicated in a variety of contexts, such as within a chat interface of client application 104, a content messaging interface of client application 104, or other such contexts all occurring within client application 104.

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as content structured as payload data (e.g., text, audio, video or other multimedia data).

The messaging server system 108 provides server-side functionality via the network 106 to a particular messaging client application 104. While certain functions of the messaging architecture 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging architecture 100 are invoked and controlled through functions available via GUIs of the messaging client application 104. In such embodiments, multiple GUIs of client application 104 may have elements to initiate capture of content using sensors of the client device 102. Rather than having each such GUI have a separate camera interface, a modular camera interface with customized context elements are provided, as described in more detail below.

Turning now specifically to the messaging server system 108, an Application Program Interface (API) server 110 is coupled to, and provides a programmatic interface to, an application server 112. The application server 112 is communicatively coupled to a database server 118, which facilitates access to a database(s) 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and/or opening an application event (e.g., relating to the messaging client application 104).

The application server 112 hosts a number of applications and subsystems, including a messaging server application 114, an image processing system 116, a social network system 122, and a messaging system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. The social network system 122 supports various social networking functions services, and makes these functions and services available to the messaging server application 114. To this end, the social network system 122 maintains and accesses various system data within the database 120. Examples of functions and services supported by the social network system 122 include the identification of other users of the messaging architecture 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
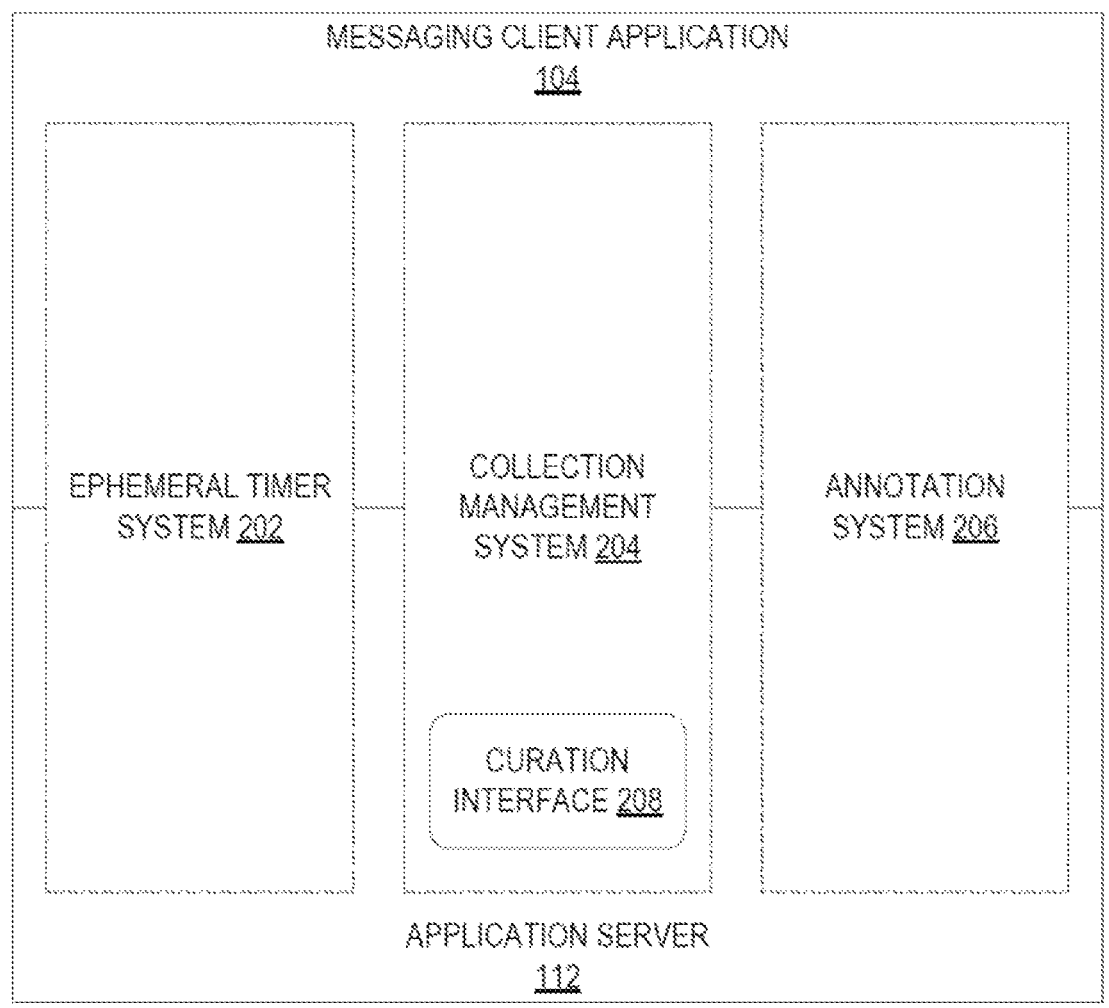
FIG. 2 is a block diagram illustrating further details regarding a messaging system, according to example embodiments.

FIG. 2 is block diagram illustrating further details regarding the messaging architecture 100, according to example embodiments. Specifically, the messaging architecture 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. As part of such operations, content with an associated ephemeral timer can be configured not just for deletion from a client device 102, but from any part of the system, including messaging server system 108 and any client device operating the messaging client application 104 and storing the content using the messaging client application 104.

The collection management system 204 is responsible for managing collections of media (e.g., a media collection that includes collections of text, image video and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging architecture 100. The annotation system 206 operatively supplies a media overlay to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects, as well as augmented reality overlays. Examples of audio and visual content include pictures, texts, logos, animations, and sound effects, as well as animated facial models, image filters, and augmented reality media content. An example of a visual effect includes color overlaying. The audio and visual content or the visual effects can be applied to a media content item (e.g., a photo or video or live stream) at the client device 102. For example, the media overlay including text can be overlaid on top of a photograph generated or taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

The annotation system 206 may also implement augmented reality content in relation to media that is accessible by the messaging client application 104. An augmented reality content item may be a real-time special effect and sound that may be added to an image or a video. Augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g., if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

Figure 3:
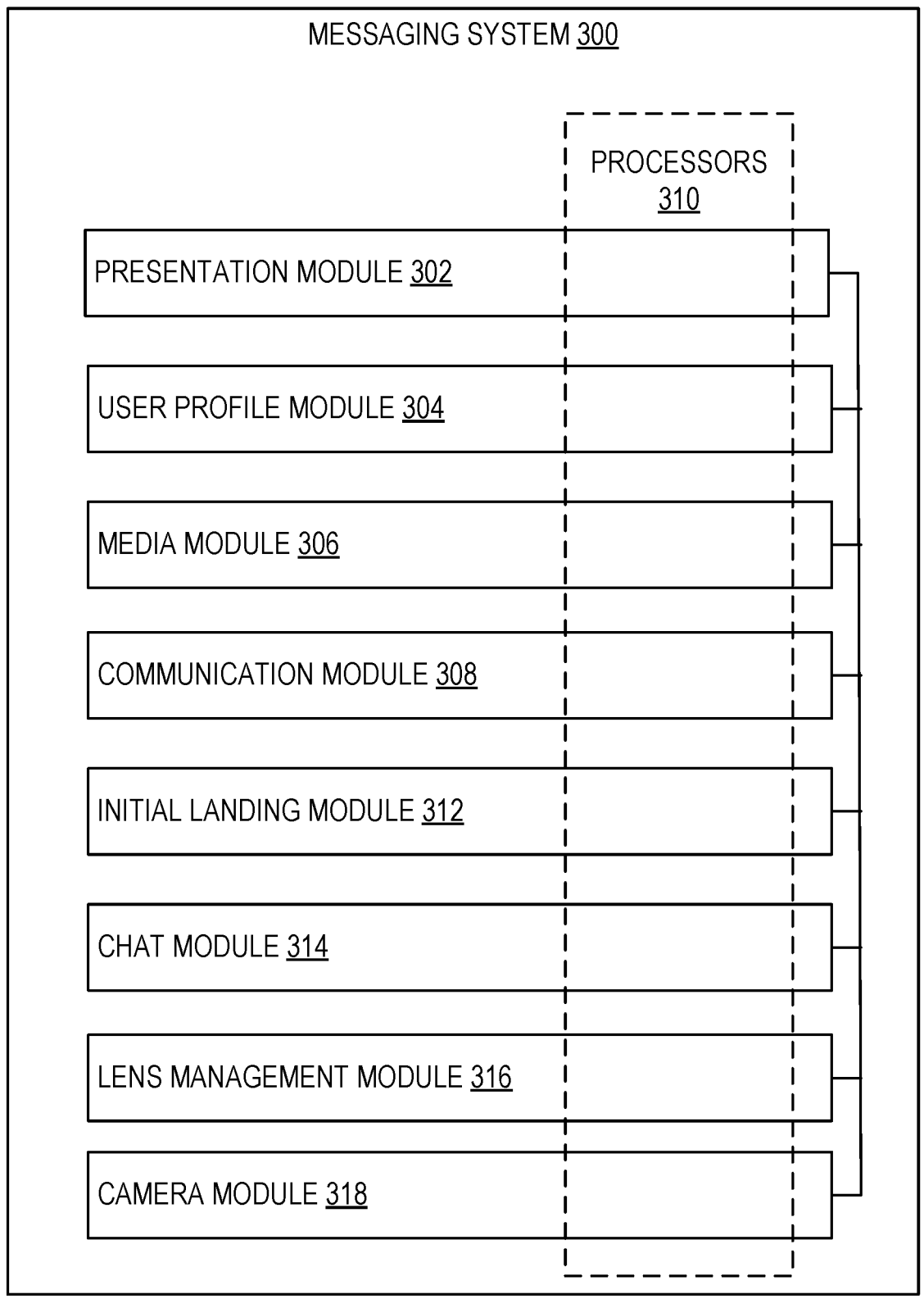
FIG. 3 is a block diagram illustrating various modules of a messaging system, according to certain example embodiments.

FIG. 3 is a block diagram illustrating components of a messaging system 300 which enable the messaging system 300 to perform operations described herein. In some embodiments, aspects of the messaging system 300 are implemented in messaging client application 104, associated messaging system 124, or both. In various embodiments, data is communicated between messaging client application 104 and elements of messaging server system 108 to enable interfaces and operations on a client device 102 in accordance with the embodiments described herein as part of an ephemeral messaging system. A client device 102 can implement an application that includes various combinations of the elements described in both FIGS. 2 and 3 as part of such embodiments. The messaging system 300 is shown as including a presentation module 302, a user profile module 304, a media module 306, a communication module 308, an initial landing module 312, a chat module 314, a lens management module 316, and camera module 318, all configured to communicate with each other. While FIG. 3 illustrates specific modules, in various embodiments, features described herein may be supported using structures not specifically separated in such a fashion, and additional modules or features may be present in different embodiments. Any one or more of these modules or other such feature support systems may be implemented using one or more processors 310 (e.g., by configuring such one or more processors to perform functions described for that module) and hence may include one or more of the processors 310. Such elements may be integrated with larger profile and data management systems within various embodiments.

Any one or more of the modules described may be implemented using hardware alone (e.g., one or more of the processors 310 of a machine) or a combination of hardware and software. For example, any module described of the messaging system 300 may physically include an arrangement of one or more of the processors 310 (e.g., a subset of or among the one or more processors of the machine) configured to perform the operations described herein for that module. As another example, any module of the messaging system 300 may include software, hardware, or both, that configure an arrangement of one or more processors 310 (e.g., among the one or more processors of the machine) to perform the operations described herein for that module. Accordingly, different modules of the messaging system (e.g. messaging system 124 or 300) may include and configure different arrangements of such processors 310 or a single arrangement of such processors 310 at different points in time. Moreover, any two or more modules of the messaging system 300 may be combined into a single module, and the functions described herein for a single module may be subdivided among multiple modules. Furthermore, according to various example embodiments, modules described herein as being implemented within a single machine, database, or device may be distributed across multiple machines, databases, or devices.

The various modules within a messaging system 300 or other management systems of a messaging system, such as the system using messaging server system 108 and client device 102, may operate in a variety of ways to improve device performance by managing system communications and interfaces as described herein.

An application 104 operating on a client device and the associated systems in a messaging server system 108 may enable significantly different types of operations for a user of client device 102. This may include chat interfaces, camera interfaces, lens interfaces, account management (e.g., friend) interfaces, and other such system. In some such systems, the use of a camera interface to quickly capture, modify, and communicate content can be valuable from a wide variety of interface contexts. One example includes, from a friend interface, capturing and communicating an image to a particular account or group of accounts. Another example includes, from a chat interface, capturing and communicating content to the chat interface. Still another example is viewing different lens or image transformation features from a lens-focused interface. An additional example is a default camera interface, or an application "landing" interface (e.g., the first interface presented on opening the application) with a camera interface. All of these examples and more illustrate context-sensitive situations in which a user may wish to access a camera interface and then quickly return to a previous interface. Embodiments described herein enable such actions in an efficient set of interface actions to improve the operation of a device while providing camera interfaces for quick capture and disposition of content. As described in FIG. 3, different contexts may have associated modules, such as chat module 314, lens management module 316, and initial landing module 312, which have associated target interfaces as part of a messaging system 300 application on a client device 102. Such target interfaces may be supported by other modules to manage content and communicate content to other accounts and devices. Such modules may additionally specifically include direct links to a modular camera interface associated with camera module 318 for efficient interface operations to capture content as described above.

Figure 4:
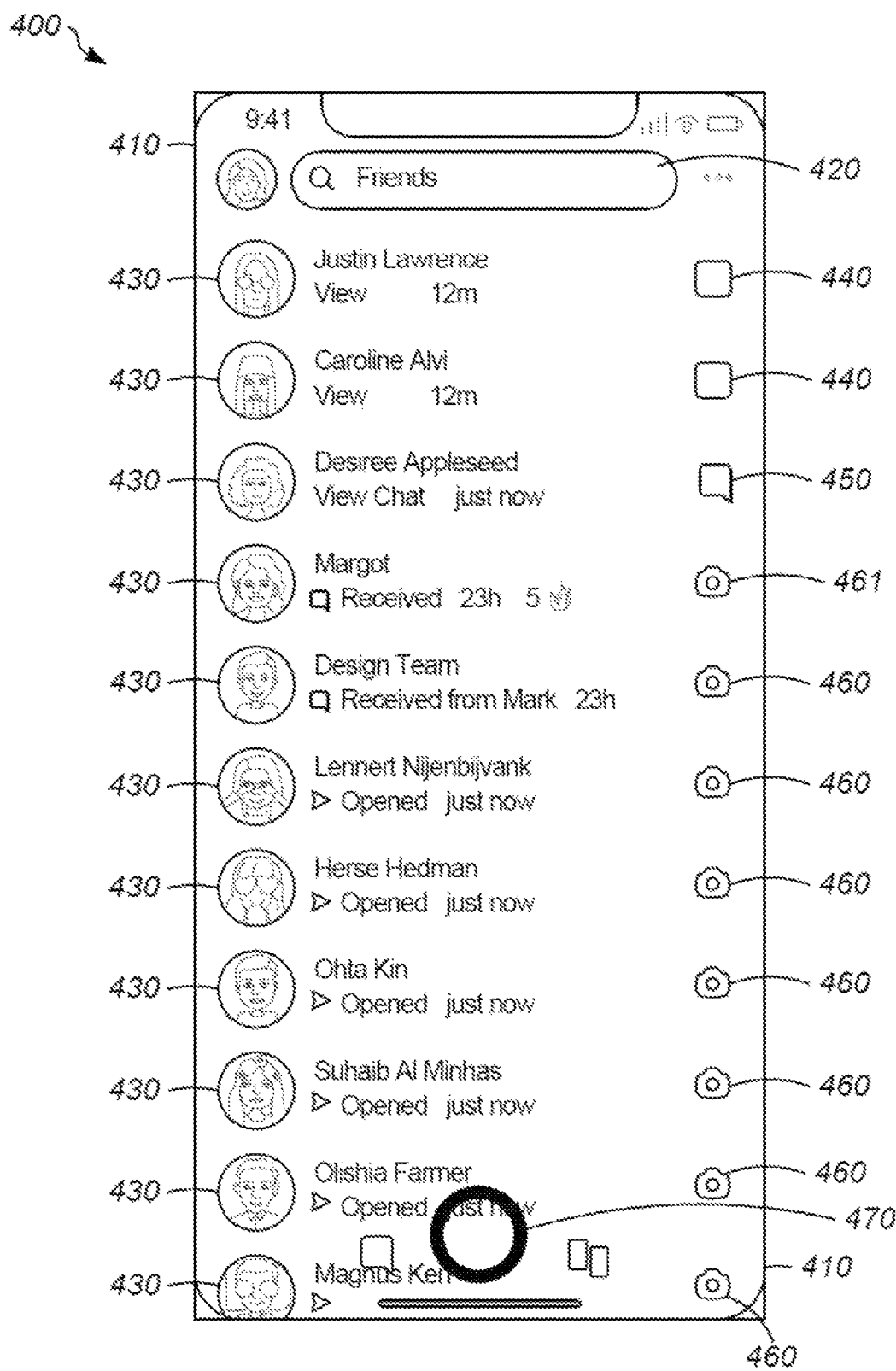
FIG. 4 is an interface diagram depicting aspects of an example target interface which may be used to initiate a modular camera interface, according to certain embodiments.

FIG. 4 is an interface diagram depicting aspects of an example target interface 400 which may be used to initiate a modular camera interface, according to certain embodiments. As discussed above, a messaging client application 104 operating on a client device 102 as part of a messaging system (e.g., system 124 or 300) may present a variety of interfaces with different contexts where efficient and quick access to camera functionality is desirable. Target interface 400 illustrates a friend account interface which may be used to access communications from other accounts in a messaging system, and to initiate communications with such other accounts. Target interface 400 (e.g., a friend account interface) is shown in display area 410 for a device (e.g., client device 102), and includes a search element 420, friend account elements 430, initiate camera element 470, and interaction element for managing communications with the friend accounts. In this example, each friend account entry has a respective interaction element, as discussed below. Initiate camera element 470 can be an interface element (e.g. a soft button) that takes a user to a generic landing interface or a modular camera interface with no specific context element. In some embodiments, the interaction elements may be based on an account status or a most recent communication with the account associated with a particular element, such as a friend account element 430. For example, one interaction element may be a view message element 440. Another element may be an initiate chat element 450, and another element may be an initiate modular camera element 460. Selection of an initiate modular camera element 460 is associated with a particular account, and causes the device presenting the target interface 400 to transition directly to a modular camera interface with context elements particular to the associated friend account, such as modular camera interface 500 of FIG. 5. Initiate modular camera element 461, for example, is associated with a particular friend account, and selection of the initiate modular camera element 461 may initiate a modular camera interface with context information specific to that particular friend account.

Figure 5:
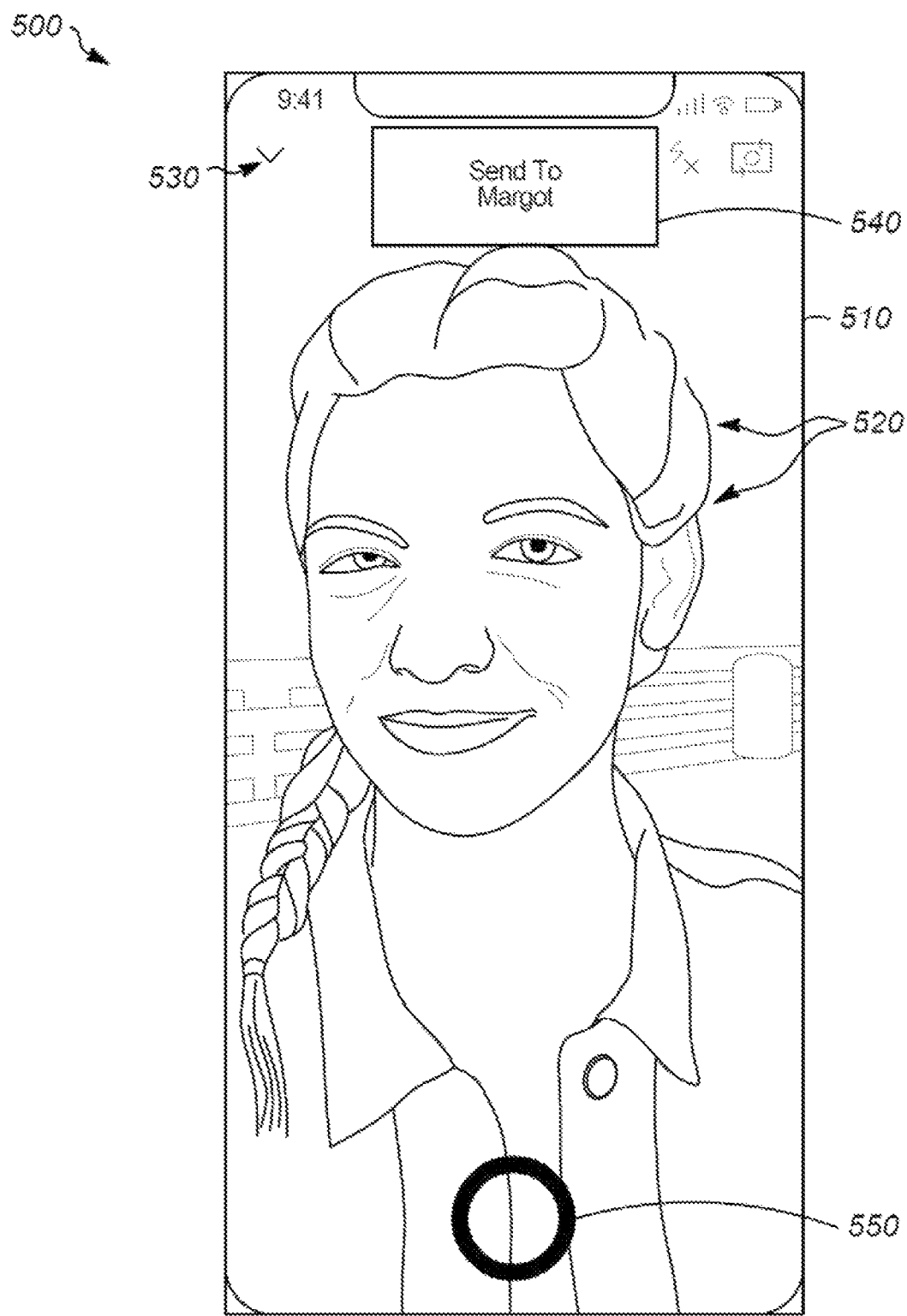
FIG. 5 is an interface diagram depicting aspects of a modular camera interface.

FIG. 5 is an interface diagram depicting aspects of a modular camera interface 500. Modular camera interface 500 is presented in a display area 510, and includes content 520 presented in the majority of the display area 510, along with return element 530, context element 540, and capture element 550. When modular camera interface 500 is initiated, either as part of a landing screen or from a target interface such as target interface 400, a content stream, such as a video content stream, is displayed in display area 510 using data captured by an image sensor of a device. Context element 540 informs the user of the contexts used to initiate the display, and notifies the user of what interface actions can occur via capture element 550 or other such elements based on this context.

In a camera interface without such context, additional interface options are present which use additional interface actions and computing resources to achieve the same results. In the illustrated embodiment, modular camera interface 500 is associated with a particular account in a messaging system, and this association is indicated in context element 540. When a user selects capture element 550, either to capture an image or a video clip from the content stream presented in display area 510, a simplified interface update is used to enable quick communication of the captured content to the associated account. For example, when a user applies finger pressure (e.g. a touch action) to capture element 550 via a touchscreen interface, and then releases the pressure, an image or video file is created, depending on the duration of the pressure signal received at the capture element 550 via the touchscreen. Upon the release, an additional interface element or an updated interface is displayed based on the context for the modular camera interface 500. In some embodiments, a message is directly sent from a camera interface without selection of a target contact following a send command, since the target was selected via a previous interface. As described above, some embodiments operate when a user applies pressure to a capture element 550. Other embodiments may respond to simple touch, contact, or proximity detection to initiate similar actions in response to inputs described above as "pressure". Some embodiments may thus operate with any sensor that operates as a capture element 550, including capture elements that use a pressure or touch, and capture elements that detect light, changes in circuit capacitance, or any other such detectable input action that can be used to initiate capture of an image or video clip as described herein.

Figure 6:
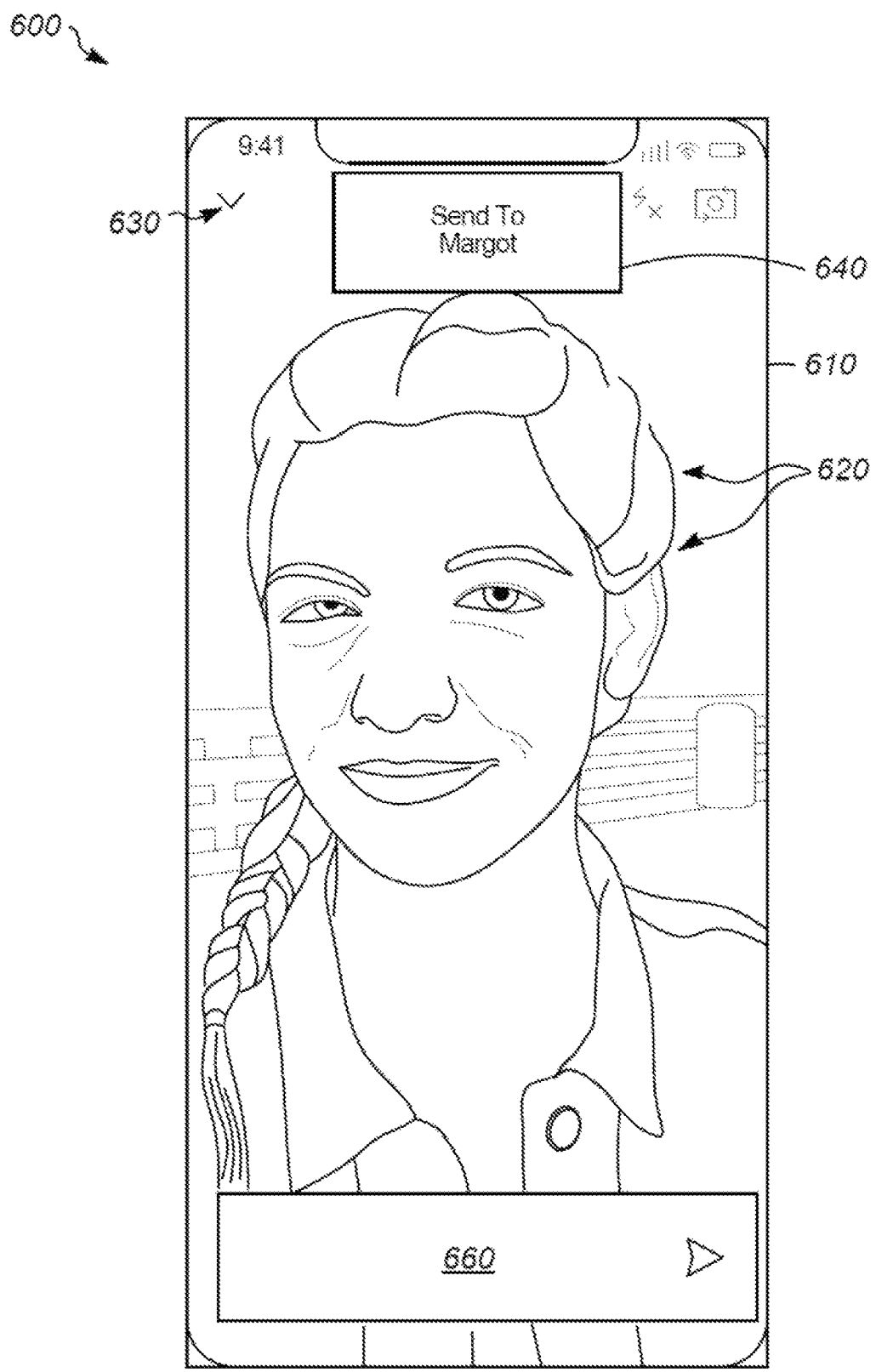
FIG. 6 is an additional interface diagram depicting aspects of a modular camera interface.

FIG. 6 is an interface diagram depicting aspects of a modular camera interface 600 including a confirmation element based on the context and prior capture of content. Similar to FIG. 5, FIG. 6 includes a return element 630, a context element 640, and content 620 in a display area 610. In FIG. 6, however, content 620 is the captured content instead of a stream of data from an image sensor. Confirmation element 660 is an interface element to confirm a communication of the content 620 to a target account. In this example embodiment, the confirmation element is a send button selectable by the user to trigger transmission of a message to the contact identified as Margot, where the message includes the displayed photo that in this example provides the image content 620. Various other embodiments may include an intermediate annotation interface for applying text, lens transformations, image touchups, overlays, or other such modifications to content 620 prior to communication. Similarly, other modular camera interfaces may use any such content-based context interface in an automatic interface update responsive to capture of content via a modular camera interface.

While certain elements of the modular camera interface remain stable based on the context, other context sensitive elements change based on the expected actions from the target interface or other context information used to initiate a modular camera interface. In the embodiment of FIG. 6, when a confirmation is selected in confirmation element 660, the interface automatically updates to a new interface. In some embodiments, this is a return to the target interface 400. Thus, if selection of an initiate modular camera interface 460 or 461 from target interface 400 causes a device to present a modular camera interface 500, and modular camera interface 600 is presented after content is captured using capture element 550 of modular camera interface 500, the device automatically returns to target interface 400 after selection of the confirmation element 660.

Similarly, if the return element 530 or 630 of such interfaces is selected at any time, the client device 102 displaying the interface will return to the target interface that initiated the modular camera interface. In the case of modular camera interfaces 500 and 600 initiated using target interface 400, selection of return element 530 or 630 will cause the client device 102 to display the target interface 400. In some embodiments, other interface actions can fulfil the same function as a return element. For example, in one embodiment, a swipe down interaction (e.g., receipt of a touch input at one area of a touchscreen followed by a motion downwards on the touchscreen) may act as a return input and transition the display to an initiating target interface 400.

Figure 7:
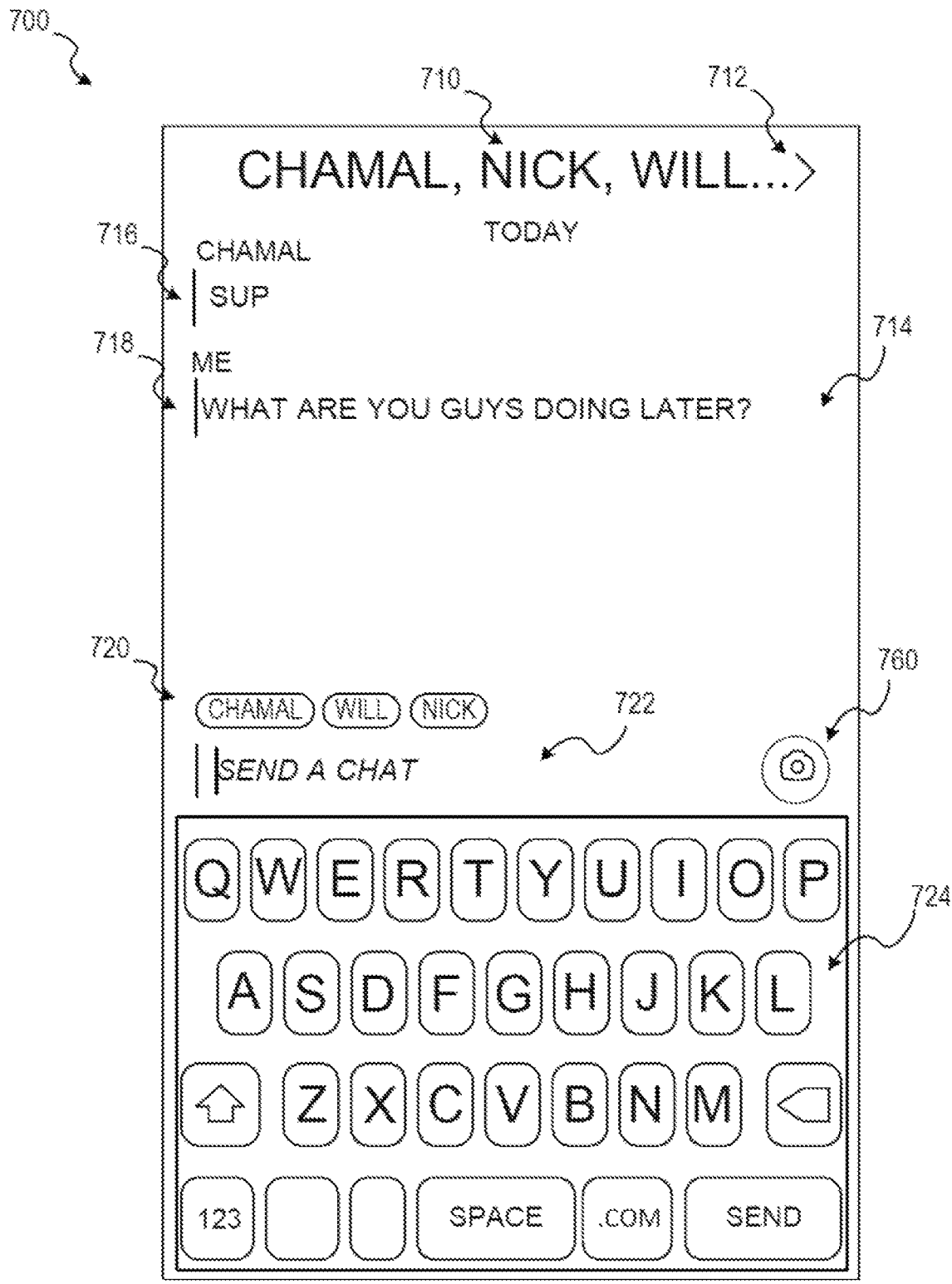
FIG. 7 is an interface diagram depicting aspects of an example target interface which may be used to initiate a modular camera interface, according to certain embodiments.
Figure 8:
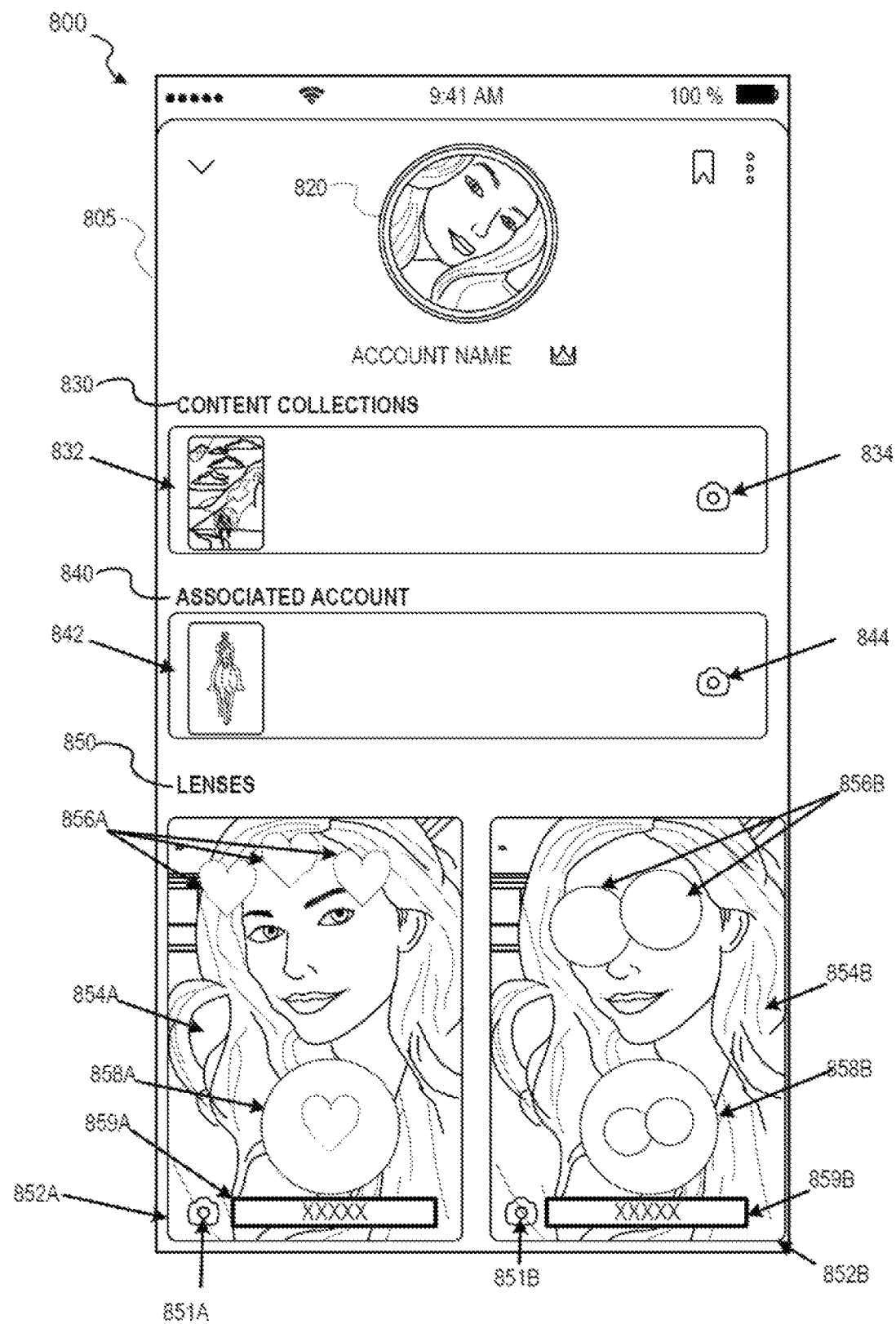
FIG. 8 is an interface diagram depicting aspects of an example target interface which may be used to initiate a modular camera interface, according to certain embodiments.

While the above is a specific example of a modular camera interface with context information to reduce interface actions and improve device performance in one specific implementation or aspect, it will be apparent that other such implementations are possible within the scope of the present innovations. FIGS. 7 and 8, for example, describe additional target interfaces which may be used with context-sensitive modular camera interfaces.

FIG. 7 is an interface diagram depicting aspects of an example target interface 700 associated with a chat interface which may be used to initiate a modular camera interface, according to certain embodiments. Target interface 700 includes a header 710 with a chat title next to a top right arrow 712. In some embodiments, interacting with a UI displayed by a chat view by tapping the top right arrow 712 button of the interface 700 navigates back to a feed interface for actions within the messaging system (e.g., 124 or 300). The title in the header 710 shows the first names (e.g., account names or account identifiers for accounts within the messaging system) of the user accounts in the group chat. Names may be associated with user accounts by the user account controller, or by an individual user (e.g., by assigning names as aliases in a friend list.) In target interface 700, chat flow 714 includes two ephemeral chat messages 716 and 718. Presence indicators 720 list group members, and may include indicators as to which group members are currently in a chat view 702 for the shared group chat on devices associated with user accounts corresponding to the presented names or user account names shown by presence indicators 720. Chat entry area 722 shows text or other content for an ephemeral chat message before the message is sent. Data entry interface 724 is a portion of the chat view 702 for entering information for an ephemeral chat message, such as the software keyboard illustrated by FIG. 7. In other embodiments, this may be a voice-to-text interface, or any other such interface for assisting with input for an ephemeral chat message.

Target interface 700 further includes an initiate modular camera element 760 for capturing content and presenting the content to the chat flow 714. Upon a user selection of the initiate modular camera element 760, a modular camera interface such as modular camera interface 600 may be presented on the client device 102, but with context information specific to the target interface 700 (e.g., context information including account names, a chat group identifier, chat focused information, etc.).

Similarly, FIG. 8. shows another example target interface 800. FIG. 8 is an interface diagram depicting aspects of an example target interface 800 which may be used to initiate a modular camera interface, according to certain embodiments. In addition to other elements described below, target interface 800 includes several initiate modular camera elements 834, 844, 851A, and 851B. Target interface 800 is a profile interface for an account in a messaging system (e.g., 124, 300), with different areas for content collections, associated accounts, and lens information. Each of these interface areas may have different associated contexts, and initiate modular camera elements may be present and associated with each, so that the different initiate modular camera elements result in modular camera interfaces with different context information. For example, initiate modular camera element 834 may provide a modular camera interface directed to adding content to a new or existing collection of content, and associated publication of the content as part of the collection. Initiate modular camera element 844 may provide a modular camera interface with content elements directed to creating a message that may be sent to one or more associated accounts. Initiate modular camera elements shown as lens tiles 852A and 852B may provide modular camera interfaces focused on trying out the lenses associated with the particular lens tiles that these elements are part of. Selection of element lens tile 852A, for example, may present a modular camera interface where the data stream presented in a display is automatically modified by the lens associated with lens tile 852A.

Target interface 800 illustrates a lens creator profile interface with a plurality of lens tiles 852. In addition to providing information about corresponding lenses, lens tiles 852 each provide a direct link to a lens summary interface for the corresponding lens of each lens tile 852.

Illustrated lens tiles 852A and 852B each includes content 854 altered by at least one example lens modification 856 for a corresponding lens. The lens modification 856A for the corresponding lens of lens tile 852A, for example, adds floating hearts to content 854A. Lens modification 856B adjusts features around the eyes of a person in content 854B, and can be presumed to track eyes in video clips, and maintain the lens modification 856B around the eyes of any people present in content 854B that the lens is applied to. As detailed above, selection of the initiate modular camera elements 851A and 851B automatically provides an interface where the lens modification is automatically performed on a data stream from image sensors of the device presented in a display area of the resulting modular camera interface to allow a user to quickly try out the associated lenses. While two lens tiles 852 are shown, a creator profile interface may include any number of lens tiles 852 in various embodiments, with the ability to scroll among the tiles and other aspects of the target interface 800 if all of the elements of the target interface 800 do not fit within a single screen. Lens tiles 852 also include a lens icon 858 and a lens name 859. In some embodiments, a number of views for each lens (e.g., a number of times the system has determined that a piece of content modified by the corresponding lens has been viewed within the messaging architecture 100) may be present in a lens tile 852 as well.

Lens tiles 852 are present within a lens interface area 850 having a title area with the illustrated lenses within lens interface area 850. In addition to the lens tiles 852 in lens interface area 850, the target interface 800 also includes a user identification area 820, content collection interface area 830, and an associated account interface area 840.

Figure 9:
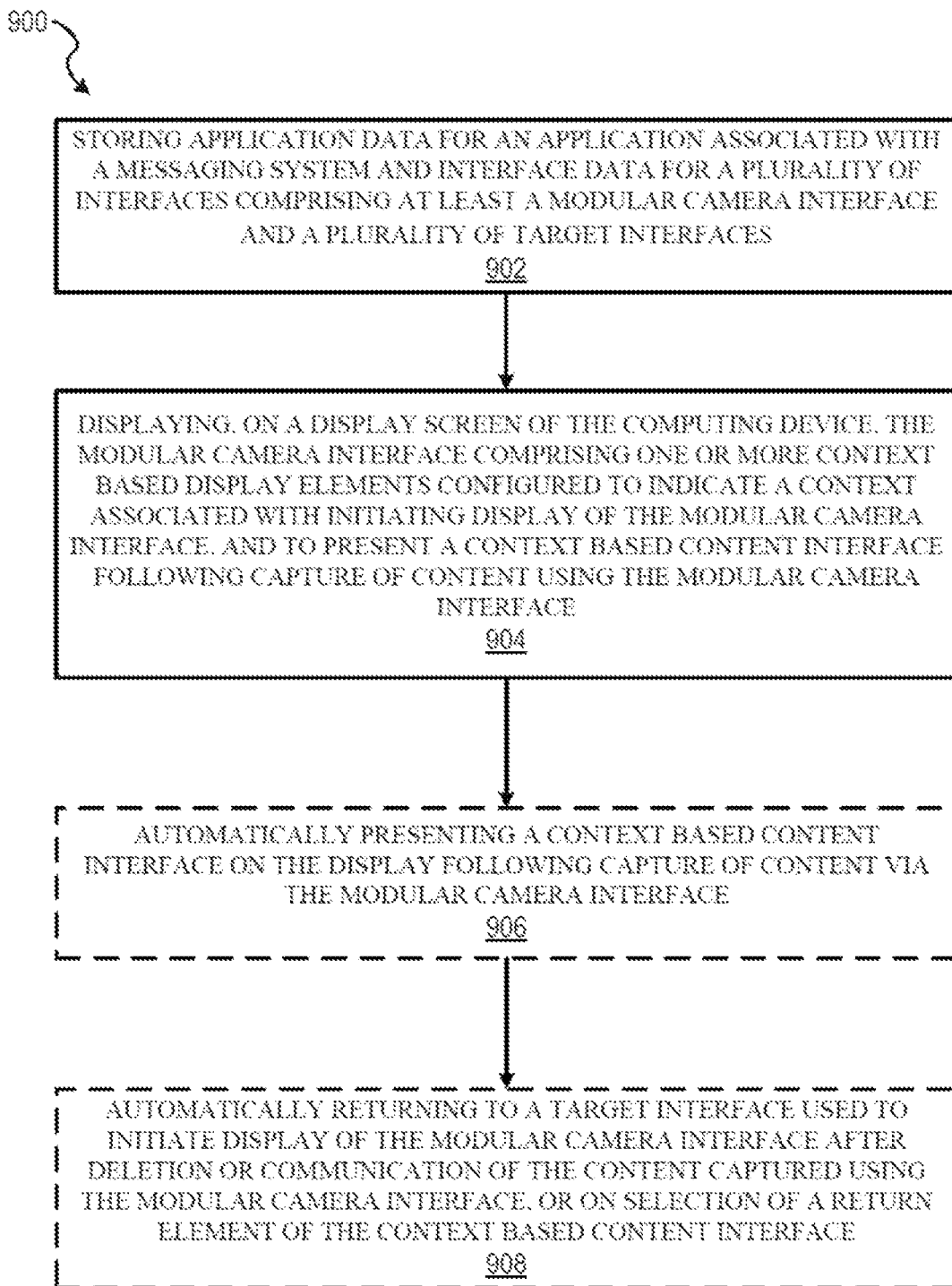
FIG. 9 is a flowchart illustrating a method for providing a modular camera interface, in accordance with some embodiments.

FIG. 9 is a flowchart illustrating a method for presenting a modular camera interface, according to certain example embodiments. FIG. 9 particularly describes a method 900 for improving the operation of a device in a messaging system (e.g., 124, 300) that allows users to access a modular camera interface with a combination of standardized and specialized features to reduce interface interactions within the messaging system. Method 900 may involve operations at a client device 102 in conjunction with operations of a messaging server system 108. In some embodiments, method 900 is embodied in computer-readable instructions stored in a non-transitory storage of a client device that performs method 900 when the instructions are executed by processing circuitry of the client device 102.

Method 900 begins with operation 902 storing, in a memory of a computing device, application data for an application associated with an ephemeral messaging system and interface data for a plurality of interfaces comprising at least a modular camera interface and a plurality of target interfaces. Operation 904 then involves displaying, on a display screen of the computing device, the modular camera interface comprising one or more context-based display elements configured to indicate a context associated with initiating display of the modular camera interface, and to present a context-based content interface following capture of content using the modular camera interface. As described above, the computing device is configured to automatically present the context-based content interface on the display following capture of content via the modular camera interface.

Some embodiments may then involve operation 906, where a context-based content interface (e.g., for testing lenses, applying lenses, adding text, or other such content modifications) is automatically presented following capture of content via the modular camera interface.

Similarly, in some embodiments, a return to the initiating target interface is automatically presented after deletion or communication of content captured by the modular camera interface, or on selection of a return element of the context-based content interface, in operation 908.

Numerous other operations are also possible in conjunction with method 900 in order to improve the operation of a computing device with efficient interface presentation and selection options for directly accessing a modular camera and communicating with accounts in a system using targeted, context-based elements of the camera.

For example, in some embodiments, display of the modular interface is automatically initiated upon running an application associated with an ephemeral messaging service on the computing device, and wherein the context for the modular camera interface as automatically initiated upon running of the application is a landing context. Some embodiments further involve displaying, on the display screen of the computing device, a first target interface comprising an initiate modular camera element, where display of the modular camera interface is initiated in response to a user selection of the initiate modular camera element. Similarly, some embodiments operate where display of the modular interface is automatically initiated upon running of an application associated with an ephemeral messaging service, and wherein the context for the modular camera interface as automatically initiated upon running of the application is a landing context.

The target interface in some embodiments is used to select context-based display elements of a modular camera interface, and some such embodiments operate where the target interface is an interface selected from a group of target interfaces such as a reply interface, a chat interface, a content collection interface, and a try lens interface. Any other such interfaces that are part of a messaging client application (e.g., 104) or a messaging system (e.g., 124, 300) may also be used. In various embodiments, the context-based content interface comprises annotation interface for modifying the content captured via the modular camera interface using one or more content modifications consisting of lenses, image overlays, or text overlays. In some such embodiments, the computing device is configured to automatically display the target interface when the content is deleted or saved to memory via the annotation interface.

When the messaging system (e.g., 124, 300) is an ephemeral messaging system with deletion triggers for removing access to content or deleting content from the entire messaging system (e.g., both messaging client application 104 and messaging server system 108), the computing device is configured to communicate an ephemeral message with an associated deletion trigger via an application associated with an ephemeral messaging system using the initiate communication element, and the annotation interface comprises an ephemeral message deletion trigger selection element. This may allow the system to select a number of seconds that content created by a modular camera interface is visible to a recipient, a number of views, a time limit for accessing the content, or other such deletion triggers.

In some embodiments, a modular camera interface is designed to provide a common camera experience in different contexts, such that the context elements of the camera do not interfere with a standardized camera experience, but simply streamline the interface operations to capture and communicate content. In such a system, the camera may be available in a wide variety of contexts but may be unfamiliar to a user when the user first encounters an instance of a modular camera, regardless of the additional context elements. Some embodiments may track use of the modular camera and display a set of camera tutorial information upon a first instantiation of the modular camera element from any target interface of the group of target interfaces within an application running on the computing device and associated with an ephemeral messaging system.

Figure 10A:
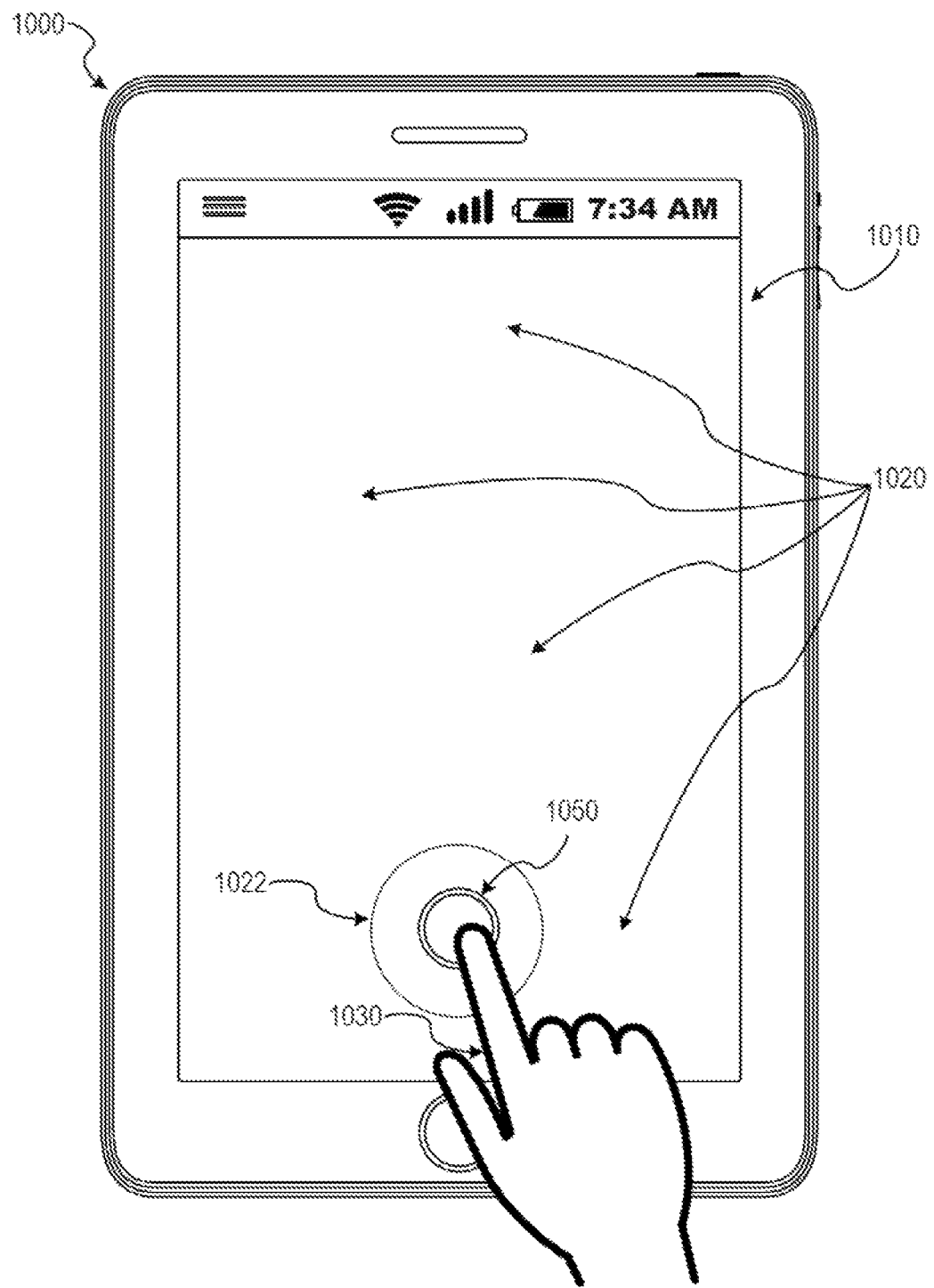
FIG. 10A is an interface diagram depicting aspects of a modular camera interface with audio input feedback, in accordance with some embodiments.
Figure 10B:
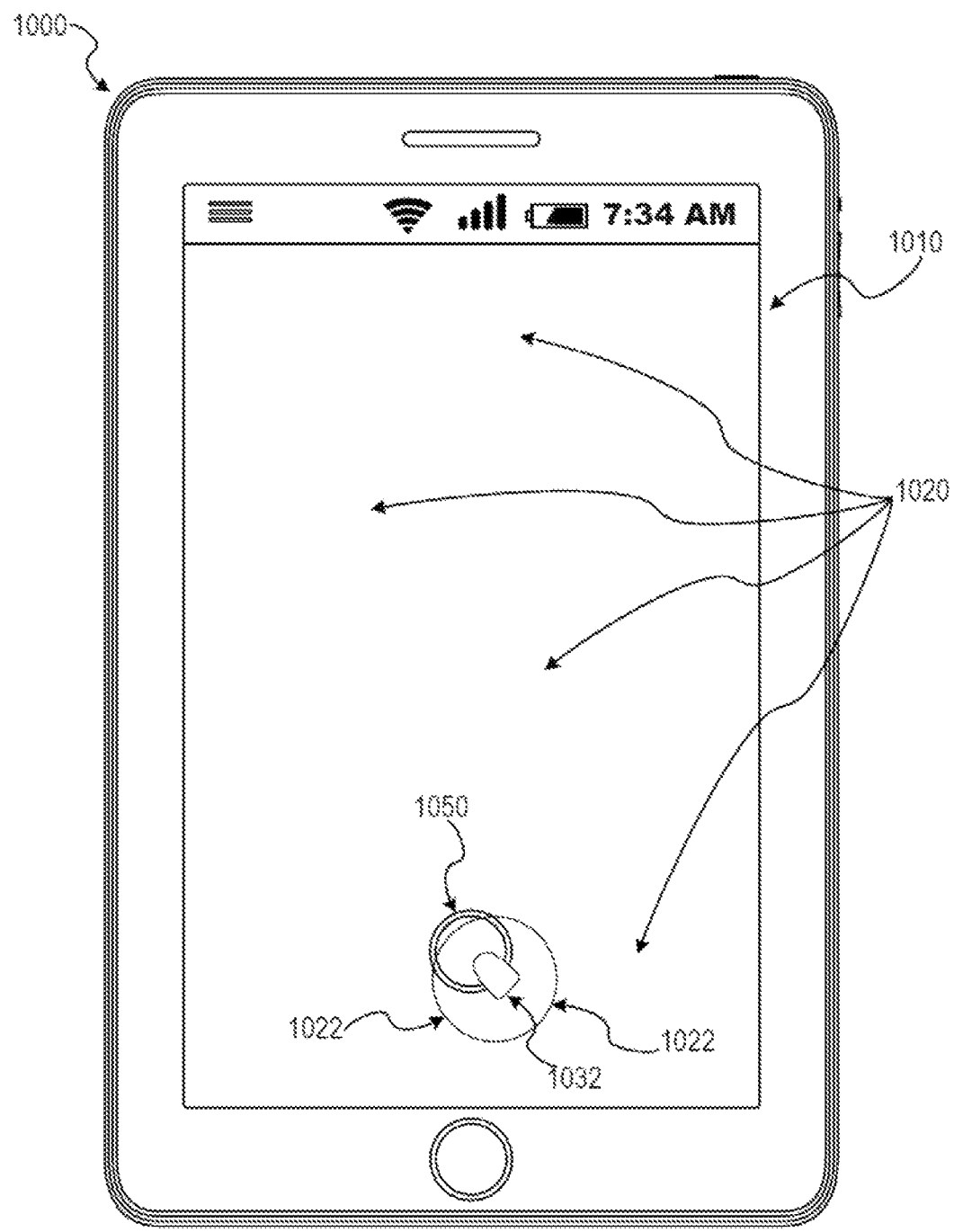
FIG. 10B is an additional interface diagram depicting aspects of a modular camera interface with audio input feedback, in accordance with some embodiments.

FIGS. 10A and 10B are interface diagrams depicting aspects of a modular camera interface 1020 with audio input feedback in accordance with some embodiments. FIG. 10A shows a client device 1000 with a display area 1010 which may present various target interfaces and associated modular camera interfaces as described above. Pressing and holding the capture content element 1050 of the modular camera interface 1020 by a user hand 1030 records video and audio data while the capture content element 1050 is selected (e.g., while a pressure signal is received around the capture content element 1050 at the touchscreen of display area 1010). While such video capture is occurring, processors of device 1000 analyze the audio portion of the captured data to assess a quality of the audio data, and present audio feedback in audio quality feedback indicator area 1022. This audio quality feedback indicator area 1022 may provide real-time or near real-time feedback on audio quality while the captured video data is displayed in the display area 1010. Such feedback may include various color, shape, or other indicators to signal events such as low-volume speech, low quality speech, large differences in the magnitude of captured audio, wind hitting a microphone, lack of audio capture, or other such audio events that may drastically reduce audio quality. By placing the audio feedback in an area around the user's hand 1030, such feedback provides immediate audio input quality feedback without significantly interfering with the visual feedback provided on a screen in a touchscreen environment where the screen is used to both control recording and display the recorded image during recording.

Figure 11:
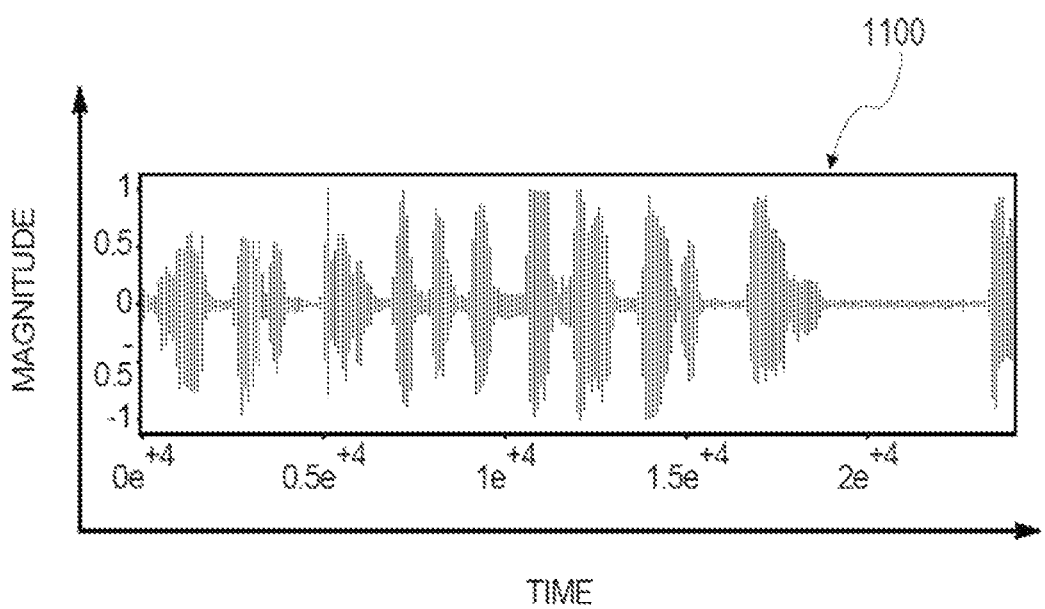
FIG. 11 illustrates aspects of a segment of audio stream data that may be analyzed to provide audio input feedback in a modular camera interface, in accordance with some embodiments.
Figure 12:
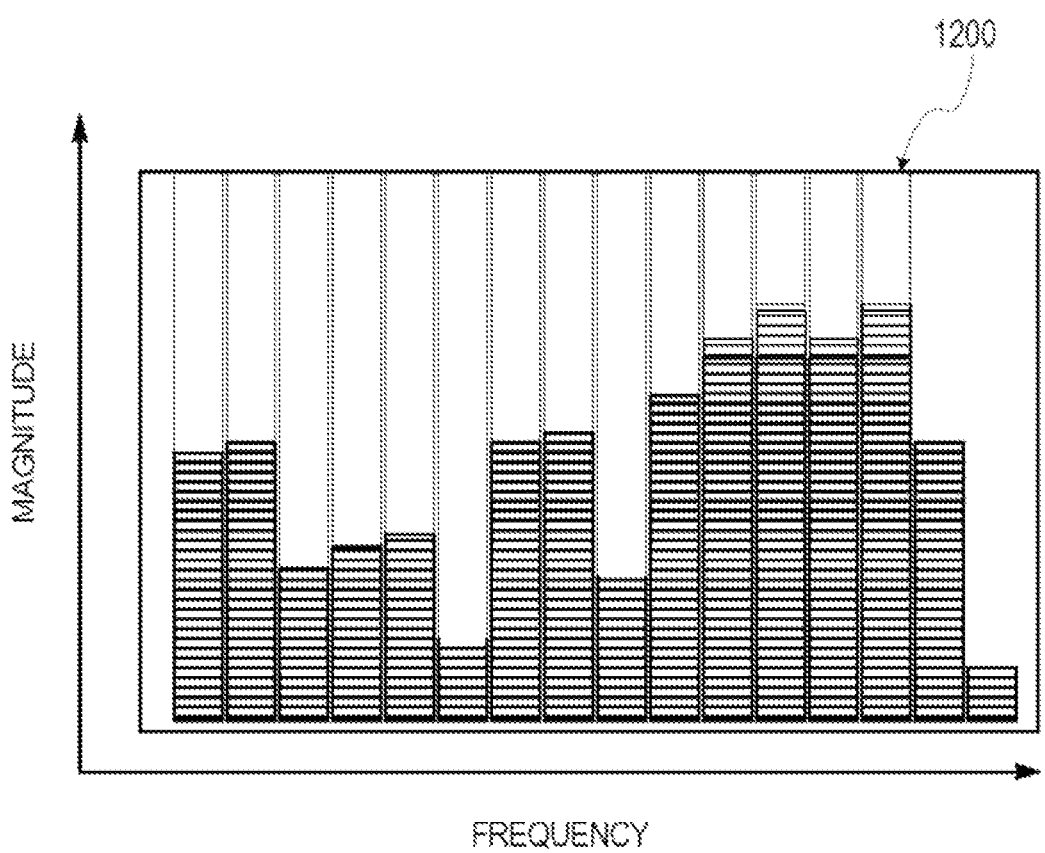
FIG. 12 illustrates additional aspects of a segment of audio stream data that may be analyzed to provide audio input feedback in a modular camera interface, in accordance with some embodiments.

FIGS. 11 and 12 indicate audio quality data that may be captured as part of content being collected by a modular camera interface and analyzed to provide audio feedback. As such audio data is captured, small segments or various different segments may be analyzed to determine changing audio quality. FIG. 11 illustrates a segment of audio data in time with audio magnitude data, and FIG. 12 illustrates frequency content of an audio stream. As the audio data is captured, different time segments may be selected and analyzed for quality based on the magnitude and frequency of content of the segment. Previous segments may be used to modify analysis of a current segment, and the presented audio feedback may provide an average quality between all segments in a captured piece of video content, a quality for a current segment, or both. In some embodiments, large changes in quality between different segments may indicate an overall low quality of the audio, or the audio feedback may indicate that some segments are low quality even while indicating that other audio segments or a majority of audio segments are high quality.

In some embodiments, an animation is presented in the audio quality feedback indicator area 1022. For example, an arrow or curved segment that does not surround the capture content element 1050 may be presented as circling the capture content element 1050 in the audio quality feedback indicator area 1022. A speed of the circling animation may provide feedback, with lack of motion indicating a lack of audio signal and a high rate of motion indicating a significant audio signal.

In various embodiments, a color of the audio quality feedback indicator area 1022, or any animation or shape presented in the area 1022, may also provide feedback. For example, a white color may indicate high quality audio, a blue color may indicate low-magnitude audio, and a red color may indicate high-magnitude low quality audio, clipping of audio where a dynamic range or acceptable input volume is exceeded, excessive background noise or interfering noise, or other such indicators of problems or low quality in the audio signal.

Some additional embodiments display a messaging interface, and receive at the messaging interface a selection of a UI element associated with a target contact (e.g. a friend or a system user). In response, such embodiments launch a camera interface that includes context information pertaining to the target user, and enables user-triggered sending of image content captured by the camera directly from the camera interface. In some such embodiments, such sending of an image content directly from the camera interface involves sending the image content without subsequent selection of the target contact from a list of contacts. One such embodiment comprises a device having a display and one or more processors coupled to the display and configured to cause presentation of an interface on the display of the device, wherein selection of a first element of the user interface causes display of a context based camera interface, and where image content captured using the context based camera interface is sent directly to a target based on the first element of the user interface. In various embodiments, different context elements selected for the camera interface based on the user interface can result in different direct action from the context-based camera interface.

In various embodiments, one or more processors of client device 1000 may use complex scoring, weighting, and other rules in generating a quality score for the audio. For example, processing of an audio stream may have different quality thresholds, or may be based on historical feedback of audio quality from previous capture of audio data at the client device 1000 or within a messaging system (e.g., 124, 300). In still further embodiments, any number of complex rules may be applied together as part of the analysis of an audio stream to present different types of feedback within audio quality feedback indicator area 1020. Various audio metrics such as dynamic range, noise levels, language clarity or language recognition data, or any other such audio-based information, may be used to select an audio quality score.

Different audio data metrics, in some embodiments, are used based on a determined audio environment. For example, a video clip with speech may be assessed differently than a clip with music, or video clips with different types of music may be assessed differently. Additionally, audio spotting to identify objectionable audio content (e.g., taboo spoken language or explicit music lyrics) can be used in some embodiments. Similarly, a target interface that initiated a modular camera interface may be used to modify or select the metrics used for assessing audio quality. For example, specific accounts may be associated with specific, different metrics, or the audio quality for a piece of content associated with a content collection to be shared with a broad audience for multiple days may be assessed differently than a piece of content shared in an ephemeral chat interface with a deletion trigger set to allow a single viewing of a video clip less than ten seconds long as part of ephemeral trigger settings.

Feedback or machine learning is used, in certain embodiments, to select or set a quality score. Such systems may use neural networks to extract features identified as preferred or interesting to system users. This may, for example, use anonymized data from users in a system to assess how users respond to audio and to update audio quality feedback provided within a modular camera interface. In some embodiments, learnable filters may be selected and automatically updated based on a database of audio quality analysis. In other embodiments, any other such sources may be used for learnable filters.

In some embodiments, rather than the audio quality feedback indicator area 1022 being a fixed area around the capture content element 1050, the audio quality feedback area 1022 may track a signal from a user finger. In FIG. 10B, for example, client device 1000 is shown with display area 1010 presenting modular camera interface 1020 and capture content element 1050, but audio quality feedback indicator area 1022 tracks a user input area 1032 instead of being fixed around a capture content element 1050. Thus, depending on where a user places a finger to create pressure on a touchscreen, the audio quality feedback indicator area 1022 will be placed around that area to avoid excessive interference with the video stream displayed in display area 1010. Similarly, the size of the audio quality feedback indicator area 1022 may change based on the size of the user input area 1032, so that the audio quality feedback indicator area 1022 may expand depending on how a user is holding the client device 1000 and pressing the touchscreen, or between different users with different-sized fingers. This allows the audio quality feedback indicator area 1022 to provide the audio feedback in an area expected to be visible around a user's finger without excessively occupying limited screen area in display area 1010.

Figure 13:
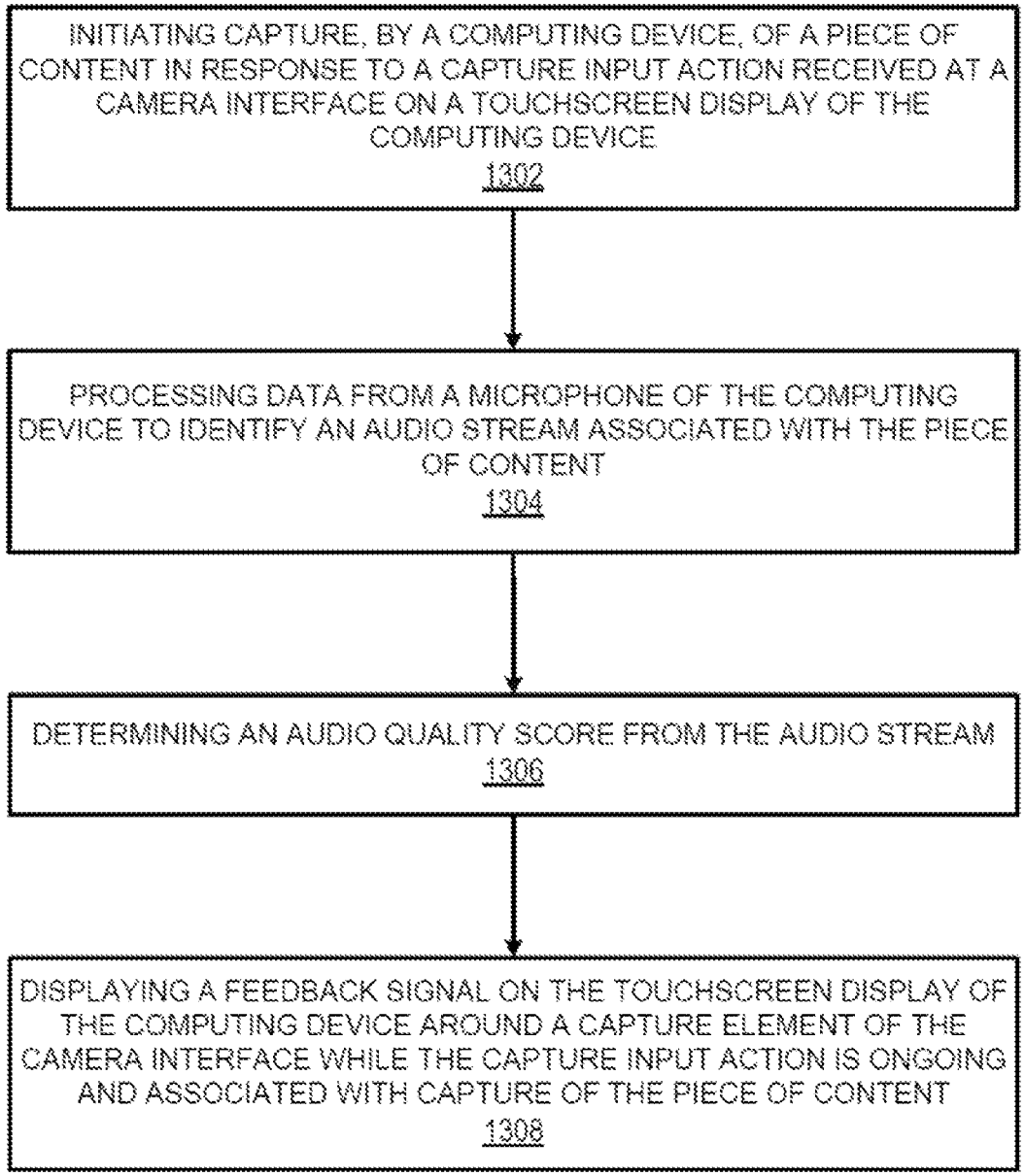
FIG. 13 is a flowchart illustrating a method for providing audio input feedback via a modular camera interface, in accordance with some embodiments.

FIG. 13 is a flowchart illustrating a method for presenting a camera interface with audio quality recording feedback, according to certain example embodiments. FIG. 13 particularly describes a method 1300 for improving the operation of a device in a system for generating content with a real-time audio quality feedback indicator as content is being captured. Method 1300 may involve operations at a client device 102 in conjunction with operations of a messaging server system 108. In some embodiments, method 1300 is embodied in computer-readable instructions stored in a non-transitory storage of a client device 102 that performs method 1300 when the instructions are executed by processing circuitry of the client device 102.

Method 1300 begins with operation 1302 initiating capture, by a computing device, of a piece of content in response to a capture input pressure action received at a camera interface on a touchscreen display of the computing device. As detailed above, the capture input pressure may be received at or near a capture element of a modular camera interface, with the content captured based on the timing of the pressure. If a quick pressure and release occurs, a single image is captured. If a press and hold occurs, a video clip is captured while the pressure action is ongoing. In other embodiments, other inputs are used to capture content via the camera interface. As video content is captured, operation 1304 involves processing data from a microphone of the computing device to identify an audio stream associated with the piece of content, and in operation 1306 the processors of the computing device determine an audio quality score from the audio stream. Such audio stream data may be processed in different ways in different embodiments to determine quality. In some embodiments, short segments of audio may be processed separately by analyzing various aspects of the audio data according to various metrics described above to set a quality score. The operation 1308 involves displaying a feedback signal on the touchscreen display of the computing device around a capture element while the capture input pressure action is ongoing. Such operations provide feedback on audio quality with an interface which efficiently makes use of screen resources in a screen-limited environment where the screen is used for both capturing data, displaying visual feedback on the image data captured, and providing audio feedback in a visual format around the capture area used to control recording of the content.

In some embodiments, the audio stream is analyzed by processing the audio stream as a plurality of segments, and for each segment of the plurality of segments of the audio stream: performing, by the computing device, an audio quality assessment on an audio signal of the segment to generate the audio quality score. The scores for individual segments may then be presented in a variety of ways, including both as averages of other segments as well as a score for an immediate segment, so that current audio data as well as an assessment of audio data for the current content video overall may be presented at the same time during capture of a video clip. Some such embodiments operate where each segment of the plurality of segments of the audio stream is analyzed using a quality detection machine learning model that analyzes the audio signal to generate a quality vector for the segment. In one or more examples, the quality vector may indicate a score for to individual aspects of the audio signal, such as quality, magnitude, clipping, background noise, other interfering noise, or one or more combinations thereof. Some such embodiments operate where each segment of the plurality of segments of the audio stream is analyzed using a feature-extraction machine learning model that analyzes the audio signal to generate a feature vector for the segment, and where the quality detection machine learning model is selected based on the feature vector. Various different metrics may be used to analyze audio data based on an identified context or sets of feature criteria for the captured content. Some embodiments, for example, analyze audio quality based on voice feature, a music feature, or a wind feature. In other embodiments, other such features or contexts may be used to analyze and determine an audio quality of content, and to provide feedback on the audio quality.

The audio quality feedback displayed during the capture of the content may additionally be stored and displayed during subsequent recorded playback of the content. Such feedback may be selected for display by a user in various ways, so that the audio feedback is optional as subsequent replays of the content occur.

Some embodiments involve a computing device with a touchscreen, with the computing device configured to display a modular camera interface comprising a content capture element. The computing device is further configured to capture content using an image sensor in response to an input action received at the content capture element (e.g. touch, pressure, optical sensing, or any other such sensing of an input action) and to display on the screen an audio quality feedback indicator responsive to the input action at or near the content capture element of the touchscreen. As described above, in some embodiments the audio feedback is presented in a fixed area around the content capture element. In other embodiments, the audio feedback area is dynamic, and may be based on the area where the input is detected to control recording of the content. Such dynamic audio feedback presentations can be configured to make the audio feedback information visible around the finger of a user who is capturing the content and viewing the screen while pressing the touchscreen with a finger to capture the content. For such operations, the audio quality feedback indicator is adjusted based on a finger size determined by an area associated with the input action such that the audio quality feedback indicator is visible around a finger generating the input action.

As part of such an interface, one or more processors of the computing device analyzes audio data received at a microphone during the pressure action at the content capture element to generate an audio quality score, which is used for the audio quality feedback indicator. In some such embodiments, the audio quality feedback indicator comprises a color output surrounding the content capture element of the modular camera interface on the touchscreen. In some embodiments, the content capture element comprises a circular area indicated by a circular display element of the modular camera interface. The audio quality feedback indicator can be made up of an animation circling the circular display element of the modular camera interface in some embodiments. In some embodiments, the audio quality feedback indicator changes during the pressure action in response to real-time changes in the audio quality score. Such changes can involve a shape change or a color change.

When a user stops recording by removing pressure (e.g., by removing a finger touching the touchscreen), the audio quality feedback indicator is removed from the modular camera interface in some embodiments. This may be associated with a context-based action or interface element presentation, or may further be associated with automatic presentation of another interface, such as an interface for editing and an ephemeral message comprising the content captured in response to the pressure action after the pressure action is removed from the touchscreen.

While certain operations and interface elements are described above, it will be apparent that various other combinations, including additional elements, repeated elements, and varying combinations of elements, are possible in accordance with the present innovations.

Software Architecture

Figure 14:
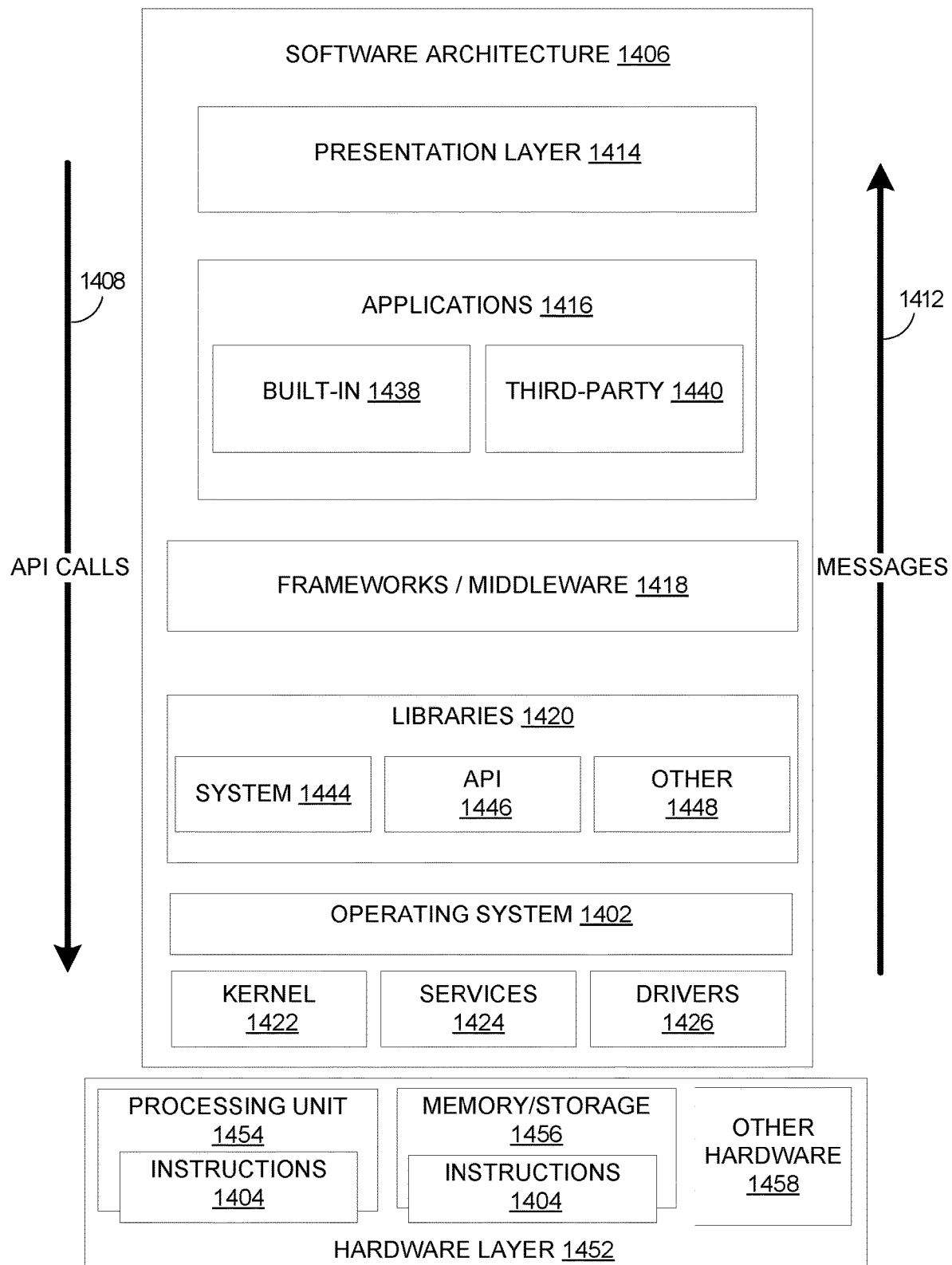
FIG. 14 is a block diagram illustrating a representative software architecture, which may be used in conjunction with various hardware architectures herein described and used to implement various embodiments.

FIG. 14 is a block diagram illustrating an example software architecture 1406, which may be used in conjunction with various hardware architectures herein described. FIG. 14 is a non-limiting example of a software architecture and it will be appreciated that many other architectures may be implemented to facilitate the functionality described herein. The software architecture 1406 may execute on hardware such as the machine 1500 of FIG. 15 that includes, among other things, processors 1504, memory 1514, and I/O components 1518. A representative hardware layer 1452 is illustrated and can represent, for example, the machine 1400 of FIG. 14. The representative hardware layer 1452 includes a processing unit 1454 having associated executable instructions 1404. Executable instructions 1404 represent the executable instructions of the software architecture 1406, including implementation of the methods, components, and so forth described herein. The hardware layer 1452 also includes memory and/or storage modules memory/storage 1456, which also have executable instructions 1404. The hardware layer 1452 may also comprise other hardware 1458.

In the example architecture of FIG. 14, the software architecture 1406 may be conceptualized as a stack of layers where each layer provides particular functionality. For example, the software architecture 1406 may include layers such as an operating system 1402, libraries 1420, frameworks/middleware 1418, applications 1416, and a presentation layer 1414. Operationally, the applications 1416 and/or other components within the layers may invoke application programming interface (API) calls 1408 through the software stack and receive messages 1412 in response to the API calls 1408. The layers illustrated are representative in nature and not all software architectures have all layers. For example, some mobile or special purpose operating systems may not provide a frameworks/middleware 1418 layer, while others may provide such a layer. Other software architectures may include additional or different layers.

The operating system 1402 may manage hardware resources and provide common services. The operating system 1402 may include, for example, a kernel 1422, services 1424, and drivers 1426. The kernel 1422 may act as an abstraction layer between the hardware and the other software layers. For example, the kernel 1422 may be responsible for memory management, processor management (e.g., scheduling), component management, networking, security settings, and so on. The services 1424 may provide other common services for the other software layers. The drivers 1426 are responsible for controlling or interfacing with the underlying hardware. For instance, the drivers 1426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1420 provide a common infrastructure that is used by the applications 1416 and/or other components and/or layers. The libraries 1420 provide functionality that allows other software components to perform tasks in an easier fashion than to interface directly with the underlying operating system 1402 functionality (e.g., kernel 1422, services 1424 and/or drivers 1426). The libraries 1420 may include system libraries 1444 (e.g., C standard library) that may provide functions such as memory allocation functions, string manipulation functions, mathematical functions, and the like. In addition, the libraries 1420 may include API libraries 1446 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1420 may also include a wide variety of other libraries 1448 to provide many other APIs to the applications 1416 and other software components/modules.

The frameworks/middleware 1418 (also sometimes referred to as middleware) provide a higher-level common infrastructure that may be used by the applications 1416 and/or other software components/modules. For example, the frameworks/middleware 1418 may provide various graphic user interface (GUI) functions, high-level resource management, high-level location services, and so forth. The frameworks/middleware 1418 may provide a broad spectrum of other APIs that may be utilized by the applications 1416 and/or other software components/modules, some of which may be specific to a particular operating system 1402 or platform.

The applications 1416 include built-in applications 1438 and/or third-party applications 1440. Examples of representative built-in applications 1438 may include, but are not limited to, a contacts application, a browser application, a book reader application, a location application, a media application, a messaging application, and/or a game application. Third-party applications 1440 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 1440 may invoke the API calls 1408 provided by the mobile operating system (such as operating system 1402) to facilitate functionality described herein.

The applications 1416 may use built in operating system functions (e.g., kernel 1422, services 1424, and/or drivers 1426), libraries 1420, and frameworks/middleware 1418 to create user interfaces to interact with users of the system. Alternatively, or additionally, in some systems interactions with a user may occur through a presentation layer, such as presentation layer 1414. In these systems, the application/component "logic" can be separated from the aspects of the application/component that interact with a user.

Figure 15:
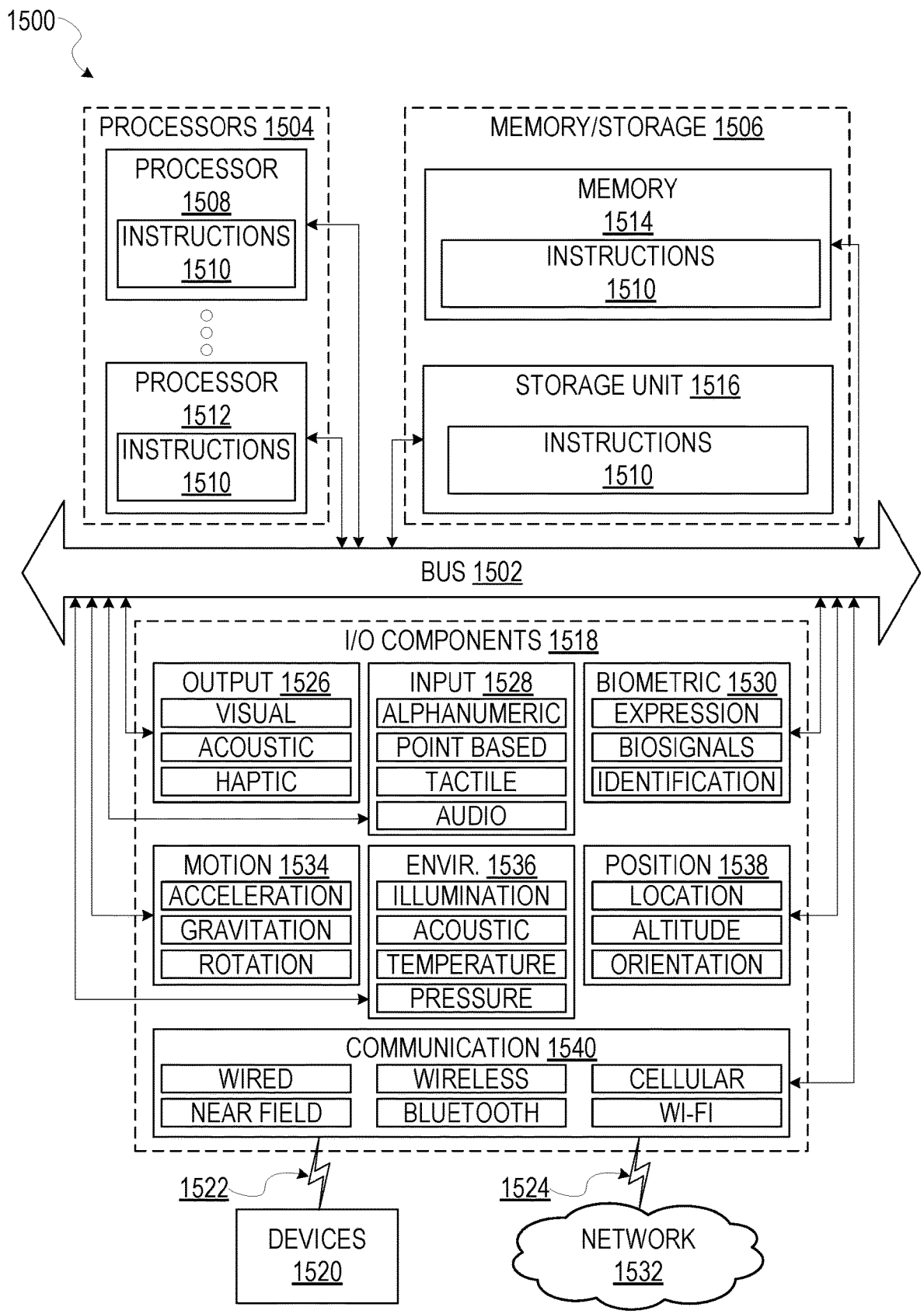
FIG. 15 is a block diagram illustrating components of a machine, according to some example embodiments, able to read instructions from a machine-readable medium (e.g., a machine-readable storage medium) and perform any one or more of the methodologies discussed herein.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1510 (e.g., software, a program, an application, an applet, an app, or other executable code) for causing the machine 1500 to perform any one or more of the methodologies discussed herein may be executed. As such, the instructions 1510 may be used to implement modules or components described herein. The instructions 1510 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1510, sequentially or otherwise, that specify actions to be taken by machine 1500. Further, while only a single machine 1500 is illustrated, the term "machine" shall also be taken to include a collection of machines that individually or jointly execute the instructions 1510 to perform any one or more of the methodologies discussed herein.

The machine 1500 may include processors 1504, memory/storage 1506, and I/O components 1518, which may be configured to communicate with each other such as via a bus 1502. The memory/storage 1506 may include a memory 1514, such as a main memory, or other memory storage, and a storage unit 1516, both accessible to the processors 1504 such as via the bus 1502. The storage unit 1516 and memory 1514 store the instructions 1510 embodying any one or more of the methodologies or functions described herein. The instructions 1510 may also reside, completely or partially, within the memory 1514, within the storage unit 1516, within at least one of the processors 1504 (e.g., within the processor's cache memory), or any suitable combination thereof, during execution thereof by the machine 1500. Accordingly, the memory 1514, the storage unit 1516, and the memory of processors 1504 are examples of machine-readable media.

The I/O components 1518 may include a wide variety of components to receive input, provide output, produce output, transmit information, exchange information, capture measurements, and so on. The specific I/O components 1518 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1518 may include many other components that are not shown in FIG. 15. The I/O components 1518 are grouped according to functionality merely for simplifying the following discussion and the grouping is in no way limiting. In various example embodiments, the I/O components 1518 may include output components 1526 and input components 1528. The output components 1526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1528 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1518 may include biometric components 1530, motion components 1534, environment components 1536, or position components 1538 among a wide array of other components. For example, the biometric components 1530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1534 may include acceleration sensor components (e.g., accelerometer), gravitation sensor components, rotation sensor components (e.g., gyroscope), and so forth. The environment components 1536 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1538 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The UO components 1518 may include communication components 1540 operable to couple the machine 1500 to a network 1532 or devices 1520 via coupling 1524 and coupling 1522, respectively. For example, the communication components 1540 may include a network interface component or other suitable device to interface with the network 1532. In further examples, communication components 1540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1520 may be another machine or any of a wide variety of peripheral devices (e.g., a peripheral device coupled via a Universal Serial Bus (USB)).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as location via Internet Protocol (IP) geo-location, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting, or a setting specified by the recipient. Regardless of the setting technique, the message is transitory.

"MACHINE-READABLE MEDIUM" in this context refers to a component, device, or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged, functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A computing device comprising:
a touchscreen;
a microphone;
one or more processors;
memory storing computer-readable instructions that, when executed by the one or more processors, cause the one or more processors to perform operations comprising:
causing display, on the touchscreen, a target interface that includes one or more user interface elements that are selectable to cause a modular camera interface to be displayed, the one or more user interface elements including a user interface element corresponding to a contact of a user of the computing device;
responsive to selection of the user interface element, causing display, on the touchscreen, of the modular camera interface comprising a content capture element and comprising one or more context-based display elements that correspond to the target interface, the one or more context-based display elements including a context-based display element corresponding to the contact of the user;
initiating capture of a first piece of content in response to a capture input touch action received at the content capture element, the capture input touch action comprising a pressure action;
processing first data from the microphone during the pressure action to identify a first audio stream associated with the first piece of content;
determining a first audio environment corresponding to the first audio stream;
responsive to determining that the first piece of content is included in a content collection that is accessible by a broad audience, analyzing first audio data corresponding to a plurality of time segments in the first audio stream in accordance with a first set of metrics to determine a first audio quality score from the first audio stream;
causing display of a first audio quality feedback indicator on the touchscreen during the pressure action, wherein the first audio quality feedback indicator is associated with the capture of the first piece of content and is based on the first audio quality score;
processing second data from the microphone to identify a second audio stream, wherein the second data corresponds to a second piece of content of an ephemeral chat interface, the second piece of content including video content that is deleted after a single viewing and is less than 10 seconds in length;
determining a second audio environment corresponding to the second audio stream, the second audio environment being different from the first audio environment;

responsive to determining that the second piece of content corresponds to the ephemeral chat interface, analyzing second audio data in the second audio stream in accordance with a second set of metrics to determine a second audio quality score from the second audio stream, the second set of metrics being different from the first set of metrics; and causing display of a second audio quality feedback indicator on the touchscreen.

2. The computing device of claim 1, wherein the first audio quality feedback indicator comprises a color output surrounding the content capture element of the modular camera interface on the touchscreen.

3. The computing device of claim 1, wherein the content capture element comprises a circular area indicated by a circular display element of the modular camera interface.

4. The computing device of claim 3, wherein the first audio quality feedback indicator comprises an animation circling the circular display element of the modular camera interface.

5. The computing device of claim 3, wherein the first audio quality feedback indicator changes during the pressure action in response to real-time changes in the first audio quality score.

6. The computing device of claim 5, wherein a change in the first audio quality feedback indicator comprises a shape change.

7. The computing device of claim 5, wherein a change in the first audio quality feedback indicator comprises a color change.

8. The computing device of claim 1, wherein the first audio quality feedback indicator is removed from the modular camera interface when the pressure action is removed from the touchscreen.

9. The computing device of claim 8, wherein the first audio quality feedback indicator is adjusted based on a finger size determined by an area associated with the pressure action such that the first audio quality feedback indicator is visible around a finger generating the pressure action.

10. The computing device of claim 9, wherein the computing device is further configured to create and transmit an ephemeral message comprising the second piece of content captured to an additional contact of the user in response to an additional input touch action on the touchscreen.

11. A method comprising:
causing display, by a computing device, of a target interface that includes one or more user interface elements that are selectable to cause a camera interface to be displayed, the one or more user interface elements including a user interface element corresponding to a contact of a user of the computing device;
responsive to selection of the user interface element, causing display, on a touchscreen display of the computing device, of the camera interface comprising a content capture element and comprising one or more context-based display elements that correspond to the target interface, the one or more context-based display elements including a context-based display element corresponding to the contact of the user;
initiating capture, by the computing device, of a first piece of content in response to a capture input touch action received at the camera interface on the touchscreen display;
processing first data from a microphone of the computing device to identify a first audio stream associated with the first piece of content;

determining a first audio environment corresponding to the first audio stream;
responsive to determining that the first piece of content is included in a content collection that is accessible by a broad audience, analyzing first audio data corresponding to a plurality of time segments in the first audio stream in accordance with a first set of metrics to determine a first audio quality score from the first audio stream;
displaying a first feedback signal on the touchscreen display of the computing device while the capture input touch action is ongoing, wherein the first feedback signal is associated with the capture of the first piece of content and is based on the first audio quality score;
processing second data from the microphone to identify a second audio stream, wherein the second data corresponds to a second piece of content of an ephemeral chat interface, the second piece of content including video content that is deleted after a single viewing and is less than 10 seconds in length;
determining a second audio environment corresponding to the second audio stream, the second audio environment being different from the first audio environment;
responsive to determining that the second piece of content corresponds to the ephemeral chat interface, analyzing second audio data in the second audio stream in accordance with a second set of metrics to determine a second audio quality score from the second audio stream, the second set of metrics being different from the first set of metrics; and
causing display of a second feedback signal on the touchscreen display.

12. The method of claim 11, further comprising:
for each individual time segment of the plurality of time segments of the first audio stream:
performing, by the computing device, an audio quality assessment on an audio signal of the individual time segment to generate the first audio quality score.

13. The method of claim 12, wherein each individual time segment of the plurality of time segments of the first audio stream is analyzed using a quality detection machine learning model that analyzes the audio signal to generate a quality vector for the individual time segment.

14. The method of claim 13, wherein each individual time segment of the plurality of time segments of the first audio stream is analyzed using a feature extraction machine learning model that analyzes the audio signal to generate a feature vector for the individual time segment; and
wherein the quality detection machine learning model is selected based on the feature vector.

15. The method of claim 14, wherein the first audio quality score is based on a set of feature criteria and the set of feature criteria are determined based on a presence of a voice feature, a music feature, or a wind feature.

16. The method of claim 11, wherein:
the content capture element comprises a circular area indicated by a circular display element of the camera interface;
the first feedback signal comprises an animation circling the circular display element of the camera interface; and
a speed of the animation circling the circular display element is based on the first audio stream.

17. A non-transitory computer-readable medium comprising instructions that, when executed by one or more processors of a computing device, cause the computing device to perform operations comprising:

causing display of a target interface that includes one or more user interface elements that are selectable to cause a modular camera interface to be displayed, the one or more user interface elements including a user interface element corresponding to a contact of a user of the computing device;

responsive to selection of the user interface element, causing display, on a touchscreen display of the computing device, of the modular camera interface comprising a content capture element and comprising one or more context-based display elements that correspond to the target interface, the one or more context-based display elements including a context-based display element corresponding to the contact of the user;

initiating capture of a first piece of content in response to a capture input action received at the modular camera interface on the touchscreen display;

processing first data from a microphone of the computing device to identify a first audio stream associated with the first piece of content;

determining a first audio environment corresponding to the first audio stream;

responsive to determining that the first piece of content is included in a content collection that is accessible by a broad audience, analyzing first audio data corresponding to a plurality of time segments in the first audio stream in accordance with a first set of metrics to determine a first audio quality score from the first audio stream;

displaying a first feedback signal on the touchscreen display of the computing device while the capture input action is ongoing, wherein the first feedback signal is associated with the capture of the first piece of content and is based on the first audio quality score;

processing second data from the microphone to identify a second audio stream, wherein the second data corresponds to a second piece of content of an ephemeral chat interface, the second piece of content including video content that is deleted after a single viewing and is less than 10 seconds in length;

determining a second audio environment corresponding to the second audio stream, the second audio environment being different from the first audio environment;

responsive to determining that the second piece of content corresponds to the ephemeral chat interface, analyzing second audio data in the second audio stream in accordance with a second set of metrics to determine a second audio quality score from the second audio stream, the second set of metrics being different from the first set of metrics; and causing display of a second feedback signal on the touchscreen display.

18. The non-transitory computer-readable medium of claim 17, wherein the first set of metrics and the second set of metrics include at least one of dynamic range, noise levels, language clarity, or language recognition data.

19. The non-transitory computer-readable medium of claim 18, wherein the first set of metrics is implemented to determine the first feedback signal in the first audio environment that includes first video content including speech and the second set of metrics is implemented to determine the second feedback signal in the second audio environment that includes second video content including music.

20. The non-transitory computer-readable medium of claim 18, wherein the target interface includes one or more user interface elements to at least one of modify or select one or more first metrics used to determine the first audio quality score from the first audio stream.

* * * * *